US011403830B2

(12) United States Patent
Kawabe et al.

(10) Patent No.: US 11,403,830 B2
(45) Date of Patent: Aug. 2, 2022

(54) IMAGE PROCESSING DEVICE, IMAGE PROCESSING METHOD, AND PROGRAM

(71) Applicant: NIPPON TELEGRAPH AND TELEPHONE CORPORATION, Tokyo (JP)

(72) Inventors: Takahiro Kawabe, Tokyo (JP); Nami Ogawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/268,059

(22) PCT Filed: Aug. 8, 2019

(86) PCT No.: PCT/JP2019/031286
§ 371 (c)(1),
(2) Date: Feb. 11, 2021

(87) PCT Pub. No.: WO2020/036114
PCT Pub. Date: Feb. 20, 2020

(65) Prior Publication Data
US 2021/0319624 A1    Oct. 14, 2021

(30) Foreign Application Priority Data

Aug. 17, 2018   (JP) .............................. JP2018-153334

(51) Int. Cl.
*G09G 5/00*     (2006.01)
*G06T 19/00*    (2011.01)
*G06T 19/20*    (2011.01)

(52) U.S. Cl.
CPC ............ *G06T 19/006* (2013.01); *G06T 19/20* (2013.01); *G06T 2219/2016* (2013.01)

(58) Field of Classification Search
CPC ...... G06T 19/003; G06T 19/006; G06T 19/20
See application file for complete search history.

(56) References Cited

U.S. PATENT DOCUMENTS

2016/0005263 A1\* 1/2016 Keilwert ............. G07F 17/3206
463/33
2017/0301135 A1\* 10/2017 Jagnow ................... G06F 3/011

OTHER PUBLICATIONS

Tachi et al., (2011) "Virtual Reality Science," The Virtual Reality Society of Japan, 3 pages.
(Continued)

*Primary Examiner* — Charles Tseng

(57) ABSTRACT

A certain object is enlarged or reduced to generate a visual object in a VR space without significantly changing an apparent quality. A first object in a real space or a virtual reality space is enlarged or reduced to generate a second object that is a visual object in a virtual reality space. Here, a first visual angle that is a visual angle or an estimated visual angle formed by the first object at a real observation position in the real space or a virtual observation position in the virtual reality space is the same or approximately the same as a second visual angle that is a visual angle formed by the second object at the virtual observation position, a second distance that is a distance from the virtual observation position to the second object is longer than a first distance that is a distance or an estimated distance from the real observation position or the virtual observation position to the first object when the second object is obtained by enlarging the first object, and the second distance is shorter than the first distance when the second object is obtained by reducing the first object.

12 Claims, 9 Drawing Sheets

(56) References Cited

OTHER PUBLICATIONS

Linkenauger et al., (2013) "Welcome to Wonderland: The Influence of the Size and Shape of a Virtual Hand On the Perceived Size and Shape of Virtual Objects", [online] dated of Jul. 11, 2013, searched on Jun. 1, 2018, Retrieved from https://doi.org/10.1371/journal.pone.0068594.

* cited by examiner

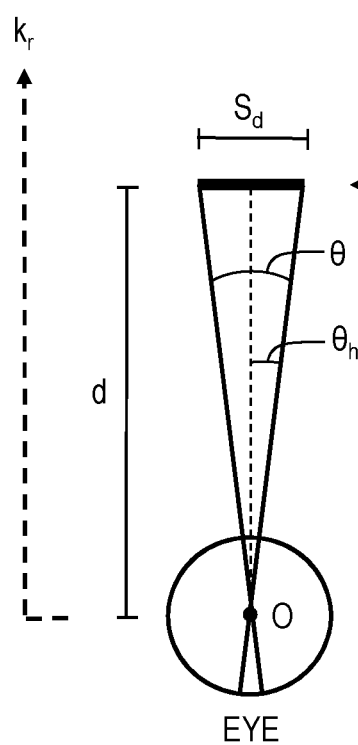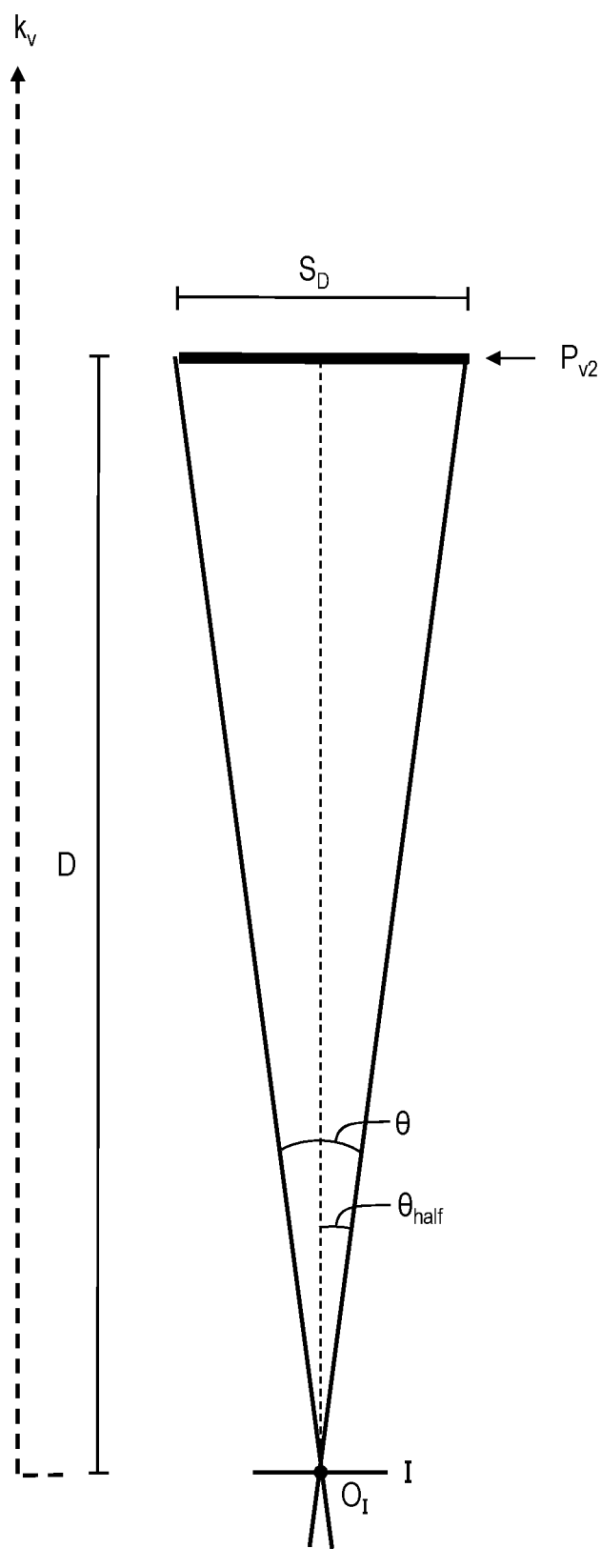
Fig. 7A
Fig. 7B

IMAGE PROCESSING DEVICE, IMAGE PROCESSING METHOD, AND PROGRAM

CROSS-REFERENCE TO RELATED APPLICATIONS

This application is a U.S. 371 Application of International Patent Application No. PCT/JP2019/031286, filed on 8 Aug. 2019, which application claims priority to and the benefit of JP Application No. 2018-153334, filed on 17 Aug. 2018, the disclosures of which are hereby incorporated herein by reference in their entireties.

TECHNICAL FIELD

The present invention relates to a virtual reality technology, and particularly, to a technology for controlling the size of a visual object in a virtual reality space.

BACKGROUND ART

Virtual reality (VR) is a technology for causing an observer to feel as if an object is present around the observer although the object is not present (does not appear) around the observer (generating the same perceptual representation) (refer to Non-Patent Literature 1 and the like, for example). To realize VR, a three-dimensional space (VR space, i.e., virtual reality space) in which perceptual representation is not substantially different from that in a real three-dimensional space may be generated using a computer and presented to an observer through a head mount display (VR goggles). The head mount display is an image display device that is put on an observer such that it completely covers the upper part of the face of the observer. The head mount display may include independent image display units respectively disposed several centimeters before the right eye and the left eye of an observer wearing the head mount display and independently present a right-eye image and a left-eye image to the right eye and the left eye. To obtain a right-eye image and a left-eye image displayed through the head mount display from a VR space generated by a computer, two points within the VR space are selected such that a real distance between the two points becomes a distance (6.5 cm) between a human eyes or a value close to the distance between the human eyes. Then, two cameras (cameras of the VR space) are arranged at these two points such that imaging directions thereof are parallel to each other and face the same direction. A camera of a VR space also has a spatial range (angle of view) in which light can be received like a camera of a real space (reality space), and the angle of view of the camera of the VR space determines a spatial range within the VR space included in a right-eye image and a left-eye image. A simulation in which a light source, an object having a surface reflecting light, and a camera that images the object are arranged within a VR space, and the camera receives light reflected by the object to image the object can be performed. This is called an imaging simulation. A right-eye image and a left-eye image displayed through a head mount display are generated as results of the imaging simulation. A result of the imaging simulation can be imaged using general 3D modeling software, a VR simulator, and the like, and 3D modeling/rendering software such as Unity (registered trademark) and Blender (registered trademark) can be used, for example. Processing from the imaging simulation to imaging can also be automated.

A 3D shape of a subject within a VR space is represented by an aggregate of polygons (triangles). A surface shape becomes rough if the number of polygons per unit volume in the VR space is small, and on the contrary, the surface shape become fine if the number of polygons per unit volume in the VR space is large. Colors and texture are displayed on an aggregate of polygons by applying image information called texture to the polygons.

In VR, it is also possible to present an image of a virtual hand (a hand displayed within a VR space) having the same apparent size as that of a real hand of an observer (a hand of the observer in a real space) through a head mount display. Here, "apparent size" means a hand size perceived by the observer. For example, when the length from a middle finger to a wrist of a real hand in the real space is defined as "hand size" for convenience, a virtual hand can be set such that it looks to have a size approximately same as the real hand while a hand size is 18 to 20 cm in general. If an aggregate of polygons (triangles) representing a 3D shape of a hand in a VR space is referred to as "a model of a virtual hand", when the size of the model of the virtual hand in the VR space is set to 18 cm to 20 cm, the apparent size of the virtual hand becomes the same as the apparent size of the real hand.

On the other hand, when the size of the model of the virtual hand in the VR space is set outside a range of a general size of the real hand, the apparent size of the virtual hand is not consistent with the apparent size of the real hand. For example, when the size of the model of the virtual hand is set to 10 cm, the apparent size of the virtual hand in the VR space appears to be less than the apparent size of the real hand. For example, when the size of the model of the virtual hand is set to 40 cm, the apparent size of the virtual hand in the VR space appears to be greater than the apparent size of the real hand (refer to Non-Patent Literature 2 and the like, for example).

Hereinafter, when a virtual hand in the VR space has the same apparent size as a real hand, the virtual hand is represented as a "virtual ordinary hand". When a virtual hand in a VR space is apparently larger than a real hand, the virtual hand is represented as a "virtual giant hand". When a virtual hand in a VR space is apparently smaller than a real hand, the virtual hand is represented as a "virtual small hand".

CITATION LIST

Non Patent Literature

[NON PATENT LITERATURE 1] "*Baacharu Riariti Gaku* (Virtual Reality Science)", supervised by Tachi Susumu, Sato Makoto, and Hirose Michitaka, Virtual Reality Society of Japan, 2011

[NON PATENT LITERATURE 2] Linkenauger, S. A., Leyrer, M., Bulthoff, H. H., and Mohler, B. J., "Welcome to Wonderland: The Influence of the Size and Shape of a Virtual Hand On the Perceived Size and Shape of Virtual Objects", [online], Jul. 11, 2013, PLOS ONE, 8(7), e68594, [retrieved Jun. 1, 2018], Internet <https://doi.org/10.1371/journal.pone.0068594>

SUMMARY OF THE INVENTION

Technical Problem

A method of increasing the size of a model of a virtual hand may be conceived as a method of representing a virtual giant hand in a VR space. On the contrary, a method of decreasing the size of the model of the virtual hand may be conceived as a method of representing a virtual small hand in the VR space.

However, when the size of the model of the virtual hand is changed, there is a case in which a problem is generated in the apparent quality of a virtual hand. For example, it may be assumed that the size of the model of the virtual hand is increased in order to represent a virtual giant hand in a VR space. When the virtual giant hand excessively approaches a camera, the model of the virtual hand excessively increases and thus the full view thereof is not included in the angle of view of the camera. As a result, the virtual giant hand protrudes from a spatial range displayed on a head mount display. In addition, when the size of the model of the virtual hand is increased, the number of polygons per unit volume constituting the virtual hand decreases and thus the surface shape of the virtual giant hand becomes rough. Further, the resolution of texture applied to the polygons also decreases. Accordingly, the subjective quality of the virtual giant hand, such as shade, colors and wrinkles, for example, is significantly different from the subjective quality of a real hand and thus an observer feels a sense of incompatibility. Moreover, in a situation in which a virtual giant hand switches to a virtual ordinary hand, the subjective quality of the virtual hands considerably change and thus an observer feels a sense of incompatibility. On the contrary, it may be assumed that the size of the model of the virtual hand is decreased in order to represent a virtual small hand in a VR space. In this case, an image region of the virtual small hand captured by a camera of the VR space excessively decreases, and thus there is a case in which detailed texture of the virtual small hand cannot be visually recognized. Furthermore, when the size of the model of the virtual hand is decreased, the surface shape of the virtual small hand becomes fine because the number of polygons per unit volume constituting the virtual hand increases. However, since the resolution of a screen when texture applied to the polygons is displayed is limited, pixel values of texture are averaged between neighboring pixels, and as a result, texture applied to the small hand appears to be blurred. Accordingly, the subjective quality of the virtual small hand is significantly different from the subjective quality of a real hand and thus an observer feels a sense of incompatibility. Furthermore, in a situation in which a virtual small hand switches to a virtual ordinary hand, the subjective quality of the virtual hands considerably change and thus an observer feels a sense of incompatibility.

These problems are common to a case in which a visual object obtained by enlarging or reducing a certain object in a VR space is presented to an observer and a case in which a visual object within a VR space which corresponds to a certain object is enlarged or reduced and presented to an observer as well as a case in which the size of a virtual hand based on a real hand of an observer is caused to be different from the size of the real hand and presented to the observer and a case in which the size of a virtual hand is changed and presented to an observer.

An object of the present invention devised in view of such circumstances is to generate a visual object in a VR space, which is obtained by enlarging or reducing a certain object, to be presented to an observer without significantly changing the apparent quality perceived by the observer.

Means for Solving the Problem

In the present invention, a first object in a real space or a virtual reality space is enlarged or reduced to generate a second object that is a visual object in the virtual reality space. However, a first visual angle or an estimated visual angle formed by the first object at a real observation position in the real space or a virtual observation position in the virtual reality space is the same as or approximately the same as a second visual angle that is a visual angle formed by the second object at the virtual observation position. A second distance that is a distance from the virtual observation position to the second object is longer than a first distance that is a distance or an estimated distance from the real observation position or the virtual observation position to the first object when the second object is obtained by enlarging the first object, and the second distance is shorter than the first distance when the second object is obtained by reducing the first object.

Effects of the Invention

Accordingly, it is possible to generate a visual object in a VR space, which is obtained by enlarging or reducing a certain object, to be presented to an observer without significantly changing the apparent quality of a material perceived by the observer.

BRIEF DESCRIPTION OF DRAWINGS

FIG. 7A and FIG. 7B are schematic diagrams illustrating a state in which a visual angle with respect to an object in a real space is the same as a visual angle with respect to an object in a virtual space and the size of the object in the virtual space is different from the size of the object in the real space.

DESCRIPTION OF EMBODIMENTS

Hereinafter, embodiments of the present invention will be described with reference to the drawings.

Principle

First, the principle of the technology described in the present embodiment will be described. Here, a case in which the size of a virtual hand based on a real hand of an observer is caused to be different from the size of the real hand and perceived will be described.

Figure 2:
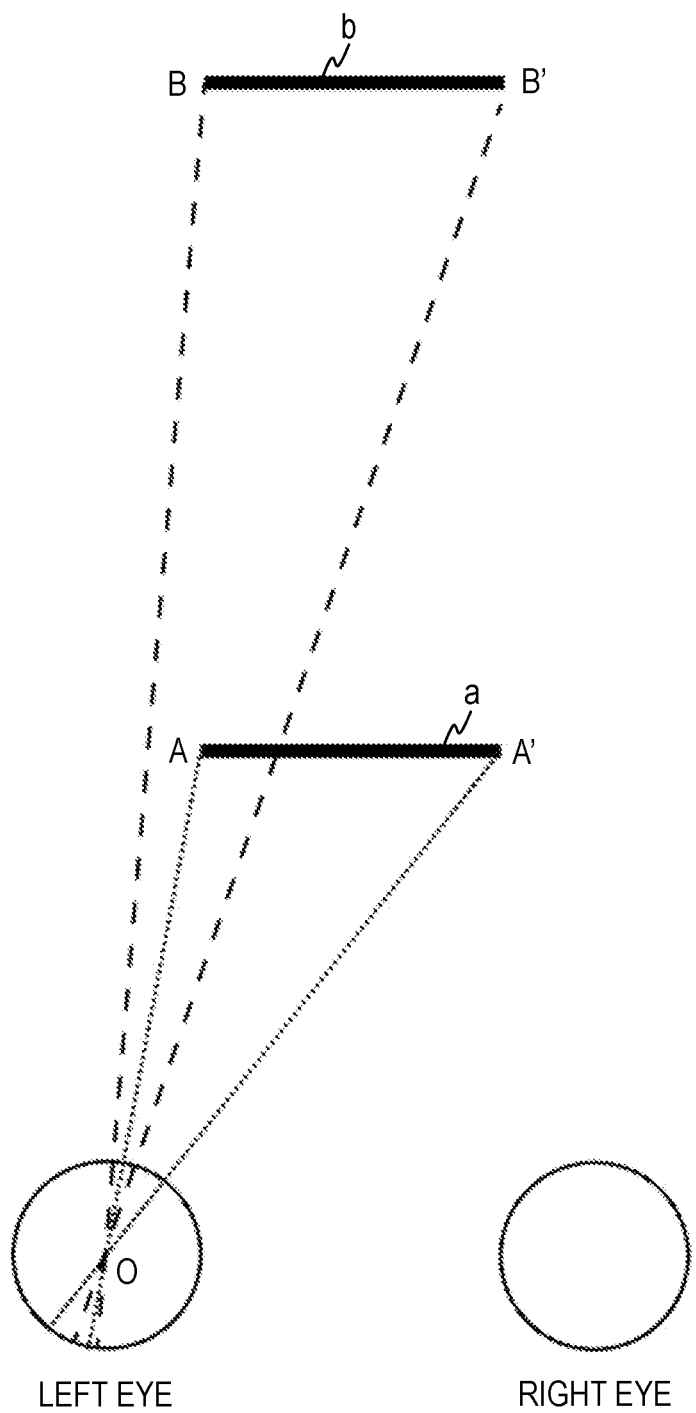
FIG. 2 is a schematic diagram illustrating a situation in which a subject a and a subject b that are objects having the same size are viewed with the left eye from the left and right eyes.

In the present technology, a virtual hand is caused to look larger or smaller than a real hand without causing the subjective quality of the virtual hand to be significantly different from the subjective quality of the real hand by using size constancy. Size constancy refers to a characteristic of the brain (vision) which determines the size of an object in consideration of the depth of the object. A human being receives light from the world. A receptor therefor is the eye. The eye has a part called the retina inside thereof, and light that has passed through the eye arrives at the retina. Retina cells in the retina are stimulated by light and a signal from the stimulated retina cells is transmitted to the brain through nerve fiber. The signal is further subjected to information processing in the brain so that the human being can see the world. The brain determines the size of an object on the basis of the size of a pattern of light arriving at the retina because the brain cannot directly measure the size of an object. Here, the size of the pattern of the light arriving at the retina corresponds to a visual angle formed by the object. FIG. 2 illustrates a situation in which a subject a and a subject b that are objects having the same size are viewed with the left eye from the left and right eyes of an observer. A visual angle formed by the subject a in the left eye is an angle AOA' in FIG. 2 and a visual angle formed by the subject b in the left eye is an angle BOB' in FIG. 2. Meanwhile, the point O represents the origin positioned in the crystalline lens of the left eye. Although the subject a and the subject b have the same size in FIG. 2, the subject b is positioned further from the left eye than the subject a. In this case, the visual angle of the subject b is less than the visual angle of the subject a. That is, the angle AOA'>the angle BOB'. However, even when the observer encounters the situation as shown in FIG. 2, the observer can determine that the subject a and the subject b have the same size. To understand size determination by the observer, it is necessary to understand a relationship between depth estimation and size estimation by the brain.

First, the brain can estimate a depth from a difference between images reflected in the right eye and the left eye (binocular parallax). In addition, when two objects are present, which one of the two objects is further away can be estimated from a relationship (relative parallax) between binocular parallaxes generated by the two objects. For example, when the subject b is gazed at in FIG. 2, the subject a generates crossed parallax and the subject b that is the gazing point does not generate binocular parallax (that is, binocular parallax generated by the subject b is zero). In general, the brain estimates that an object which generates crossed parallax is positioned in front of an object which does not generate binocular parallax and thus recognizes that the subject a is positioned in front of the gazed at subject b. On the other hand, when the subject a is gazed at in FIG. 2, for example, the subject b generates non-crossed parallax and the subject a that is the gazing point does not generate binocular parallax (that is, binocular parallax generated by the subject a is zero). In general, the brain estimates that an object which generates non-crossed parallax is positioned behind an object which does not generate binocular parallax and thus recognizes that the subject b is positioned behind the gazed at subject a. In this manner, the brain can recognize that the subject b is further away than the subject a using binocular parallax as depth information.

Next, how the brain determines the sizes of the subject a and the subject b on the basis of this depth estimation will be described. The brain recognizes that the visual angle (angle BOB') generated by the subject b is less than the visual angle (angle AOA') generated by the subject a from the fact that a pattern of light of the subject b arriving at the retina is smaller than a pattern of light of the subject a. The brain also recognizes that the subject b is further away than the subject a according to the aforementioned depth estimation. Further, the brain generally has prior knowledge that a distantly located object looks smaller than when located nearby. The brain determines that the subject a and the subject b are most likely to have the same size from a relationship between recognition with respect to visual angles and depths and prior knowledge. This is the action of size constancy.

Figure 3:
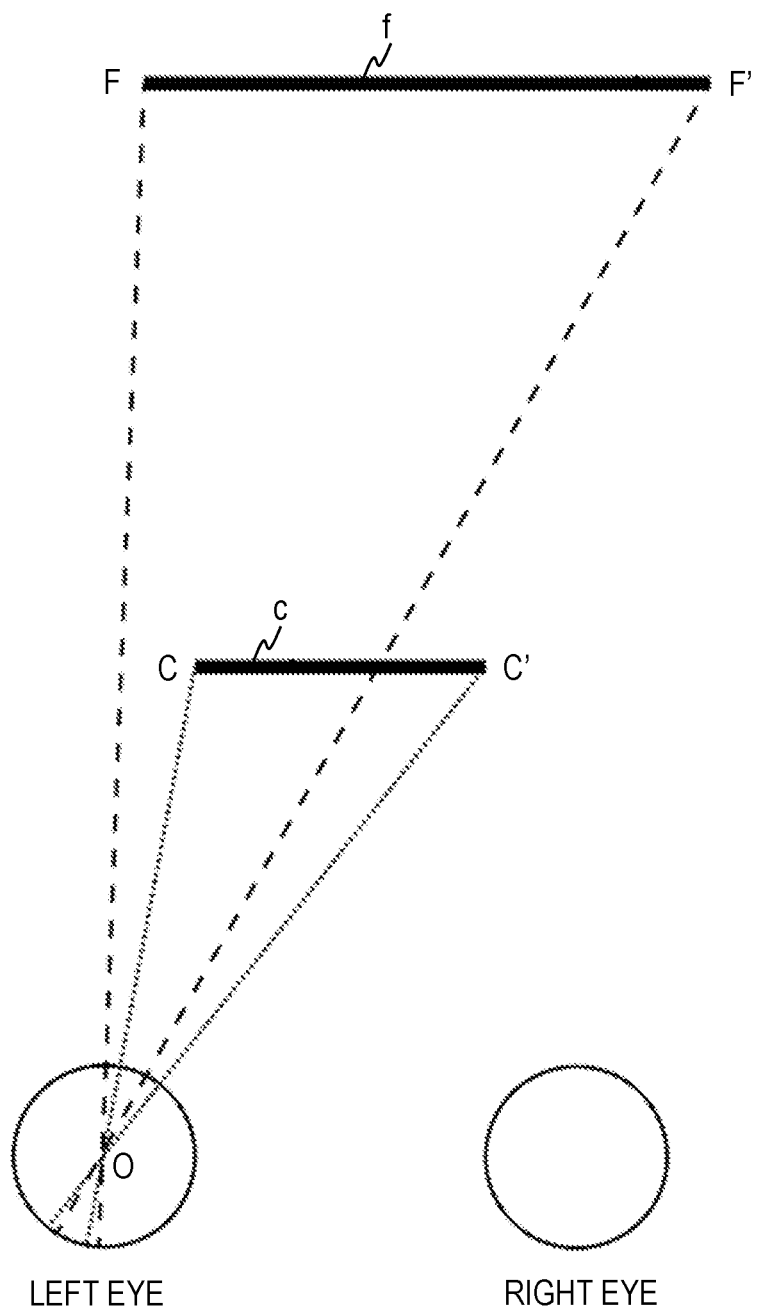
FIG. 3 is a schematic diagram illustrating a situation in which a subject c and a subject f that are objects having different sizes are viewed with the left eye from the left and right eyes.

FIG. 3 illustrates a situation in which a subject c and a subject f which are objects having different sizes are viewed with the left eye from the left and right eyes of an observer. A visual angle formed by the subject c in the left eye is an angle COC' and a visual angle formed by the subject f in the left eye is an angle FOF'. The angle COC' equals the angle FOF'. In addition, the subject f is larger than the subject c and the subject f is at a position farther from the left eye than the subject c. Here, the brain recognizes that FOF'=COC' from the fact that a pattern of light of the subject c and a pattern of light of the subject f arriving at the retina have the same size. The brain also recognizes that the subject f is further away than the subject c according to the aforementioned depth estimation. Further, the brain has the aforementioned prior knowledge. Accordingly, the brain supposes that the actual size of the subject f is larger than the subject c because the subject f is further away than the subject c although the visual angles at the subject c and the subject f are identical. This is also the action of size constancy.

The present technology operates using a depth position of a virtual hand sensed by the brain on the basis of binocular parallax while causing a visual angle of a real hand when the real hand moving in a real space is observed by an observer to be consistent with a visual angle of a virtual hand imaged by a camera in a VR space. Accordingly, the virtual hand is caused to apparently look larger or smaller than the real hand without causing the subjective quality of the virtual hand to be significantly different from the subjective quality of the real hand.

Figure 4:
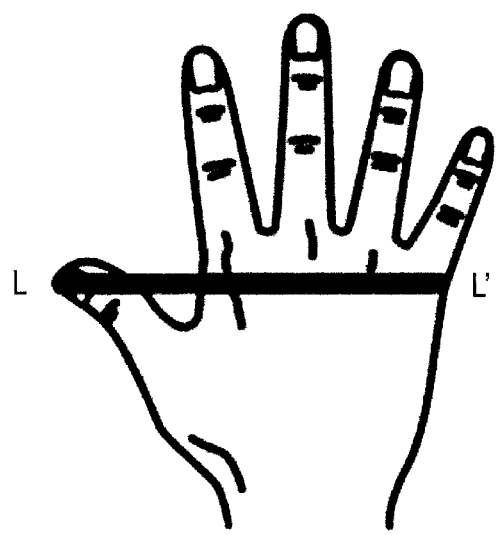
FIG. 4 is a schematic diagram illustrating a reference part of a hand.
Figures 5A, 5B:
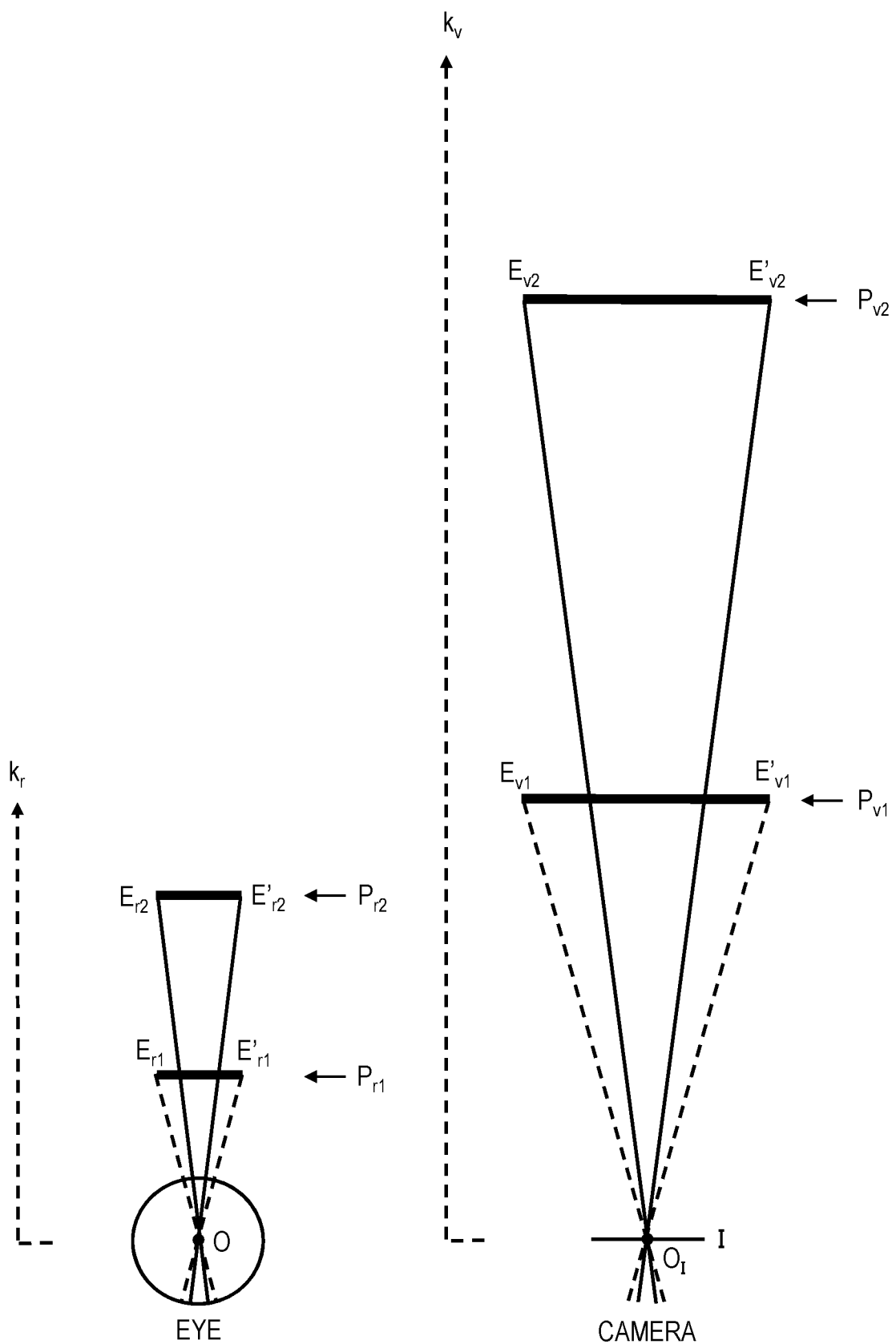
FIG. 5A is a schematic diagram illustrating visual angle change and depth change in a real hand and FIG. 5B is a schematic diagram illustrating visual angle change and depth change in a virtual giant hand based on the real hand.

First, in the present technology, a case in which a virtual hand is caused to apparently look larger than a real hand, that is, a case in which a virtual giant hand is presented will be described. As illustrated in FIG. 4, in the following description, a distance from the tip of the thumb of a right hand to the base of the little finger of the right hand (a linear dimension from L to L') is defined as "hand size" and a visual angle is calculated for convenience. A part of the hand used to calculate a visual angle is referred to as a reference part and the length (linear dimension) of the reference part is referred to as a reference distance. A visual angle formed by the reference distance is a visual angle of the hand. In addition, the reference part is represented by a horizontal line segment. FIG. 5A illustrates visual angle change in a real hand when a depth from an eye of an observer to the real hand changes in the present technology, and FIG. 5B illustrates visual angle change in a virtual hand based on the real hand when a depth of the virtual hand from a camera changes. A distance from an origin O of the eye of the observer to a 3D shape of the real hand (e.g., a distance from the origin O to the center point of the 3D shape of the real hand) is represented as "depth distance of the real hand" and a distance from an origin $O_I$ (e.g., focal point) positioned at an imaging plane I of a camera that images a VR space to the virtual hand (e.g., a distance from the origin $O_I$ to the center point of the 3D shape of the virtual hand) is represented as "depth distance of the virtual hand". $k_r$ represents the depth distance of the real hand and $k_v$ represents the depth distance of the virtual hand. In the present technology, the virtual hand is moved in the VR space in accordance with movement of the real hand in a real space. That is, the virtual hand is moved simultaneously with the real hand from beginning to end. For example, when the real hand moves from a position $P_{r1}$ to a position $P_{r2}$ of the real space, the virtual hand is moved from a position $P_{v1}$ to a position $P_{v2}$ of the VR space in accordance with movement of the real hand. The depth distance $k_r$ of the real hand and the depth distance $k_v$ of the virtual hand change according to movement of the real hand and the virtual hand. However, a ratio between the depth distance $k_r$ of the real hand and the depth distance $k_v$ of the virtual hand based on the real hand is constant all the time. A horizontal line segment $E_{r1}$-$E'_{r1}$ in FIG. 5A represents a reference part of the real hand when the real hand is disposed at the position $P_{r1}$ of the real space and a horizontal line segment $E_{r2}$-$E'_{r2}$ represents a reference part of the real hand when the real hand is disposed at the position $P_{r2}$ of the real space. In addition, a horizontal line segment $E_{v1}$-$E'_{v1}$ in FIG. 5B illustrates a reference part of the virtual hand disposed at the position $P_{v1}$ when the real hand is disposed at the position $P_{r1}$. A horizontal line segment $E_{v2}$-$E'_{v2}$ represents a reference part of the virtual hand disposed at the position $P_{v2}$ when the real hand is disposed at the position $P_{r2}$.

When the real hand moves in the real space, the depth distance of the real hand changes. In the case of the example of FIG. 5A, the depth distance of the real hand disposed at the position $P_{r1}$ is shorter than the depth distance of the real hand disposed at the position $P_{r2}$. Since the reference distance of the real hand does not change, the linear dimension of the horizontal line segment $E_{r1}$-$E'_{r1}$ is equal to the linear dimension of the horizontal line segment $E_{r2}$-$E'_{r2}$. In this case, a visual angle (angle formed by broken lines) $E_{r1}OE'_{r1}$ formed by the real hand at the position $P_{r1}$ at the origin O is greater than a visual angle (angle formed by solid lines) $E_{r2}OE'_{r2}$ formed by the real hand at the position $P_{r2}$. However, even if the real hand moves from the position $P_{r1}$ to the position $P_{r2}$ or moves from the position $P_{r2}$ to the position $P_{r1}$ in the real space, the observer senses that the depth of the real hand having the same size has naturally changed instead of sensing that the real hand has become small or large.

As illustrated in FIG. 5B, in the present technology, the virtual hand is moved in accordance with movement of the real hand and the depth distance $k_v$ of the virtual hand is changed in accordance with the depth distance $k_r$ of the real hand. Here, the depth distance of the virtual hand disposed at the position $P_{v1}$ is shorter than the depth distance of the virtual hand disposed at the position $P_{v2}$. As illustrated in FIG. 5B, the reference distance of the virtual hand is constant all the time and the linear dimension of the horizontal line segment $E_{v1}$-$E'_{v1}$ is equal to the linear dimension of the horizontal line segment $E_{v2}$-$E'_{v2}$ in the present technology. In this case, a visual angle (angle formed by broken lines) $E_{v1}O_I E'_{v1}$ formed by the virtual hand at the position $P_{v1}$ at the origin $O_I$ is greater than a visual angle (angle formed by solid lines) $E_{v2}O_I E'_{v2}$ formed by the virtual hand at the position $P_{v2}$. However, even if the virtual hand is moved from the position $P_{v1}$ to the position $P_{v2}$ or moved from the position $P_{v2}$ to the position $P_{v1}$ in the VR space according to the present technology, the observer can be caused to sense that the depth of the virtual hand having the same size has naturally changed instead of sensing that the virtual hand has become small or large.

In addition, in the present technology, the visual angle (angle formed by broken lines of FIG. 5B) $E_{v1}O_I E'_{v1}$ formed by the virtual hand at the position $P_{v1}$ at the origin $O_I$ is caused to be consistent with the visual angle (angle formed by broken lines of FIG. 5A) $E_{r1}OE'_{r1}$ formed by the real hand at the position $P_{r1}$ at the origin O. Further, in the present technology, change in the visual angle formed by the real hand according to movement of the real hand from the position $P_{r1}$ to the position $P_{r2}$ and change in the visual angle formed by the virtual hand according to movement of the virtual hand from the position $P_{v1}$ to the position $P_{v2}$ are caused to be the same as each other. Accordingly, in the present technology, when the virtual hand is moved in a direction from the position $P_{v1}$ to the position $P_{v2}$ in accordance with movement of the real hand in a direction from the position $P_{r1}$ to the position $P_{r2}$, the visual angle formed by the virtual hand is caused to be consistent with the visual angle formed by the real hand all the time. In the same manner, in the present technology, the visual angle (angle formed by solid lines of FIG. 5B) $E_{v2}O_I E'_{v2}$ formed by the virtual hand at the position $P_{v2}$ at the origin $O_I$ is caused to be consistent with the visual angle (angle formed by solid lines of FIG. 5A) $E_{r2}OE'_{r2}$ formed by the real hand at the position $P_{r2}$ at the origin O. Further, in the present technology, change in the visual angle formed by the real hand according to movement of the real hand from the position $P_{r2}$ to the position $P_{r1}$ and change in the visual angle formed by the virtual hand according to movement of the virtual hand from the position $P_{v2}$ to the position $P_{v1}$ are caused to be the same as each other. Accordingly, in the present technology, even when the virtual hand is moved in a direction from the position $P_{v2}$ to the position $P_{v1}$ in accordance with movement of the real hand in a direction from the position $P_{r2}$ to the position $P_{r1}$, the visual angle formed by the virtual hand is caused to be consistent with the visual angle formed by the real hand all the time. As described above, the visual angle formed by the virtual hand is caused to be consistent with the visual angle formed by the real hand all the time in the present technology. Thereby, the apparent quality of the virtual hand becomes the same as the apparent quality of the real hand all the time in the present technology. Meanwhile, as shown in FIG. 5B, the depth distance $k_v$ of the virtual hand is greater (becomes further away) than the depth distance $k_r$ of the real hand in FIG. 5A all the time in the present technology. Accordingly, as shown in FIG. 5B, the reference distance of the virtual hand is greater than the reference distance of the real hand in FIG. 5A all the time in the present technology. Accordingly, the virtual hand of FIG. 5B has an apparent size greater than that of the real hand of FIG. 5A according to the action of size constancy, and thus is perceived as a virtual giant hand in the present technology. Accordingly, it is possible to cause the virtual hand to be perceived as a giant hand without significantly changing the subjective quality of the real hand in the present technology.

Figure 6A:
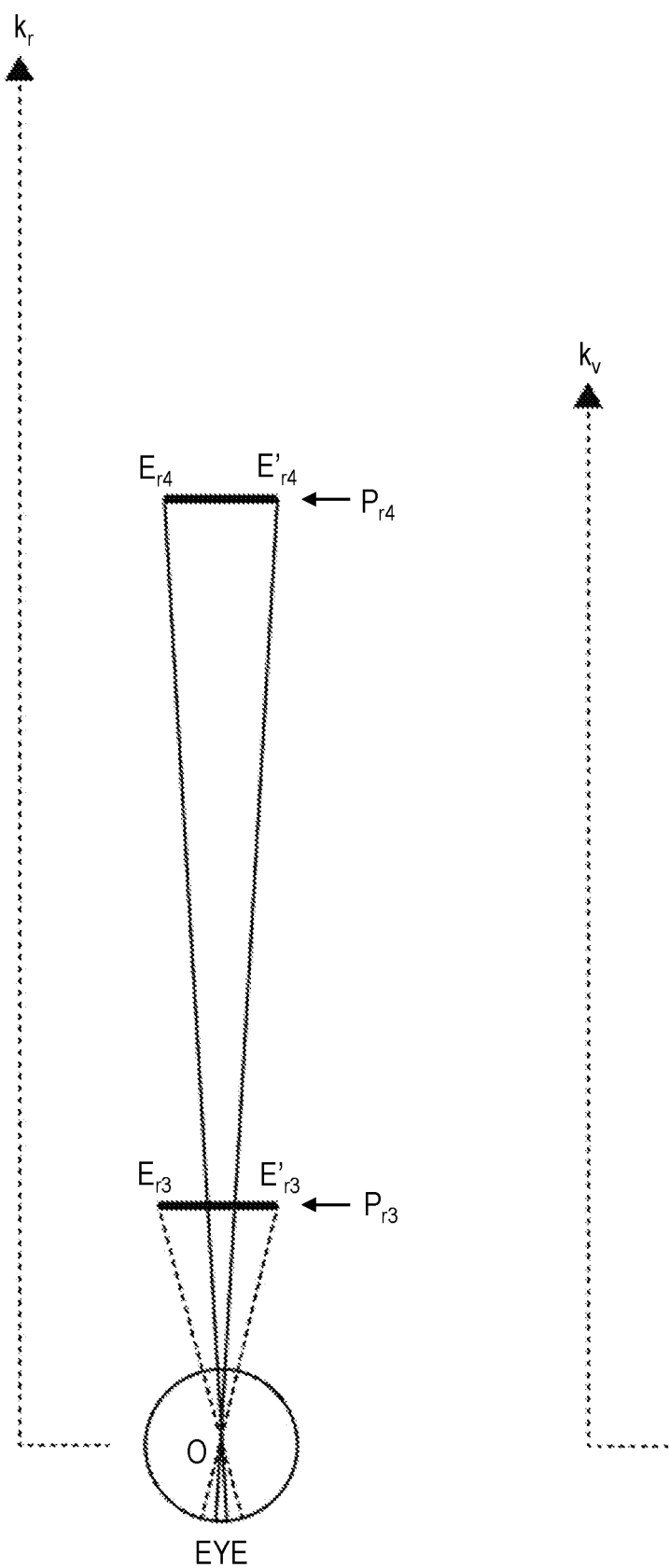
FIG. 6A is a schematic diagram illustrating visual angle change and depth change in a real hand and FIG. 6B is a schematic diagram illustrating visual angle change and depth change in a virtual small hand based on the real hand.
Figure 6B:
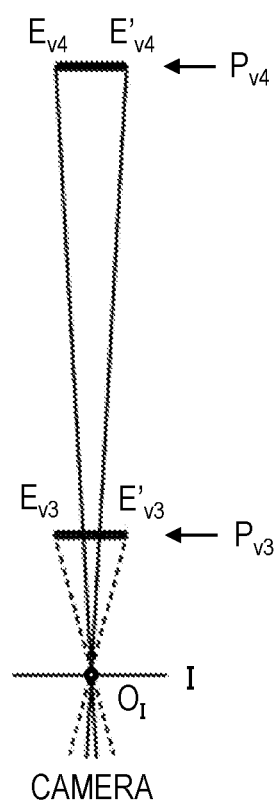

Next, a case in which a virtual hand is caused to apparently look smaller than a real hand, that is, a case in which a virtual small hand is presented in the present technology will be described. FIG. 6A illustrates visual angle change in a real hand when a depth from an eye of an observer to the real hand changes in the present technology and FIG. 6B illustrates visual angle change in a virtual small hand based on the real hand when a depth of the virtual hand from a camera changes. In the present technology, the virtual hand is moved simultaneously with the real hand from beginning to end even when the virtual hand is caused to look smaller than the real hand. For example, when the real hand moves from a position $P_{r3}$ to a position $P_{r4}$ of the real space, the virtual hand is moved from a position $P_{v3}$ to a position $P_{v4}$ of the VR space in accordance with movement of the real hand. The depth distance $k_r$ of the real hand and the depth distance $k_v$ of the virtual hand change according to movement of the real hand and the virtual hand. A ratio between the depth distance $k_r$ of the real hand and the depth distance $k_v$ of the virtual hand based on the real hand is constant all the time even when the virtual hand is caused to look smaller than the real hand. A horizontal line segment $E_{r3}$-$E'_{r3}$ in FIG. 6A illustrates a reference part of the real hand when the real hand is disposed at the position $P_{r3}$ of the real space and a horizontal line segment $E_{r4}$-$E'_{r4}$ illustrates a reference part of the real hand when the real hand is disposed at the position $P_{r4}$ of the real space. In addition, a horizontal line segment $E_{v3}$-$E'_{v3}$ in FIG. 6B illustrates a reference part of the virtual hand disposed at the position $P_{v3}$ when the real hand is disposed at the position $P_{r3}$. A horizontal line segment $E_{v4}$-$E'_{v4}$ represents a reference part of the virtual hand disposed at the position $P_{v4}$ when the real hand is disposed at the position $P_{r4}$.

When the real hand moves in the real space, the depth distance of the real hand changes. In the case of the example of FIG. 6A, the depth distance of the real hand disposed at the position $P_{r3}$ is shorter than the depth distance of the real hand disposed at the position $P_{r4}$. Since the reference distance of the real hand does not change, the linear dimension of the horizontal line segment $E_{r3}$-$E'_{r3}$ is equal to the linear dimension of the horizontal line segment $E_{r4}$-$E'_{r4}$. In this case, a visual angle (angle formed by broken lines) $E_{r3}OE'_{r3}$ formed by the real hand at the position $P_{r3}$ at the origin O is greater than a visual angle (angle formed by solid lines) $E_{r4}OE'_{r4}$ formed by the real hand at the position $P_{r4}$. However, even if the real hand moves from the position $P_{r3}$ to the position $P_{r4}$ or moves from the position $P_{r4}$ to the position $P_{r3}$ in the real space, the observer senses that the depth of the real hand having the same size has naturally changed instead of sensing that the real hand has become small or large.

As illustrated in FIG. 6B, in the present technology, the virtual hand is moved in accordance with movement of the real hand and the depth distance $k_v$ of the virtual hand is changed in accordance with the depth distance $k_r$ of the real hand. Here, the depth distance of the virtual hand disposed at the position $P_{v3}$ is shorter than the depth distance of the virtual hand disposed at the position $P_{v4}$. As illustrated in FIG. 6B, the reference distance of the virtual hand is constant all the time and the linear dimension of the horizontal line segment $E_{v3}$-$E'_{v3}$ is equal to the linear dimension of the horizontal line segment $E_{v4}$-$E'_{v4}$ in the present technology. In this case, a visual angle (angle formed by broken lines) $E_{v3}O_fE'_{v3}$ formed by the virtual hand at the position $P_{v3}$ at the origin $O_f$ is greater than a visual angle (angle formed by solid lines) $E_{v4}O_fE'_{v4}$ formed by the virtual hand at the position $P_{v4}$. However, even if the virtual hand is moved from the position $P_{v3}$ to the position $P_{v4}$ or moved from the position $P_{v4}$ to the position $P_{v3}$ in the VR space according to the present technology, the observer can be caused to sense that the depth of the virtual hand having the same size has naturally changed instead of sensing that the virtual hand has become small or large.

In addition, in the present technology, the visual angle (angle formed by broken lines of FIG. 6B) $E_{v3}O_fE'_{v3}$ formed by the virtual hand at the position $P_{v3}$ at the origin $O_f$ is caused to be consistent with the visual angle (angle formed by broken lines of FIG. 6A) $E_{r3}OE'_{r3}$ formed by the real hand at the position $P_{r3}$ at the origin O. Further, in the present technology, change in the visual angle formed by the real hand according to movement of the real hand from the position $P_{r3}$ to the position $P_{r4}$ and change in the visual angle formed by the virtual hand according to movement of the virtual hand from the position $P_{v3}$ to the position $P_{v4}$ are caused to be the same as each other. Accordingly, in the present technology, when the virtual hand is moved in a direction from the position $P_{v3}$ to the position $P_{v4}$ in accordance with movement of the real hand in a direction from the position $P_{r3}$ to the position $P_{r4}$, the visual angle formed by the virtual hand is caused to be consistent with the visual angle formed by the real hand all the time. In the same manner, in the present technology, the visual angle (angle formed by solid lines of FIG. 6B) $E_{v4}O_fE'_{v4}$ formed by the virtual hand at the position $P_{v4}$ at the origin $O_f$ is caused to be consistent with the visual angle (angle formed by solid lines of FIG. 6A) $E_{r4}OE'_{r4}$ formed by the real hand at the position $P_{r4}$ at the origin O. Further, in the present technology, change in the visual angle formed by the real hand according to movement of the real hand from the position $P_{r4}$ to the position $P_{r3}$ and change in the visual angle formed by the virtual hand according to movement of the virtual hand from the position $P_{v4}$ to the position $P_{v3}$ are caused to be the same as each other. Accordingly, in the present technology, even when the virtual hand is moved in a direction from the position $P_{v4}$ to the position $P_{v3}$ in accordance with movement of the real hand in a direction from the position $P_{r4}$ to the position $P_{r3}$, the visual angle formed by the virtual hand is caused to be consistent with the visual angle formed by the real hand all the time. As described above, the visual angle formed by the virtual hand is caused to be consistent with the visual angle formed by the real hand all the time in the present technology even in the cases of the examples of FIG. 6A and FIG. 6B. Thereby, the apparent quality of the virtual hand becomes the same as the apparent quality of the real hand all the time in the present technology. Meanwhile, as shown in FIG. 6B, the depth distance $k_v$ of the virtual hand is less (becomes closer) than the depth distance $k_r$ of the real hand in FIG. 6A all the time in the present technology. Accordingly, as shown in FIG. 6B, the reference distance of the virtual hand is less than the reference distance of the real hand in FIG. 6A all the time in the present technology. Accordingly, the virtual hand of FIG. 6B has an apparent size less than that of the real hand of FIG. 6A according to action of size constancy, and thus is perceived as a virtual small hand in the present technology. Accordingly, it is possible to cause the virtual hand to be perceived as a small hand without significantly changing the subjective quality of the real hand in the present technology.

First Embodiment

Next, a first embodiment will be described. The first embodiment will represent an example in which, to realize the above-described principle in an image processing system, a position and a depth distance of a real hand are acquired, a longer distance than a depth distance of a real hand is determined as a depth distance of a virtual hand when an observer needs to be caused to recognize the virtual hand as a virtual giant hand, whereas a shorter distance than the depth distance of the real hand is determined as a depth distance of the virtual hand when the observer needs to be caused to recognize the virtual hand as a virtual small hand, the size of a model of a virtual hand is determined such that a visual angle of the virtual hand disposed at the position of the depth distance is the same as a visual angle of the real hand, and a VR space including the virtual hand for which both the depth distance and the size have been determined is presented through a right-eye display and a left-eye display of a head mount display.

<Configuration>

Figure 1:
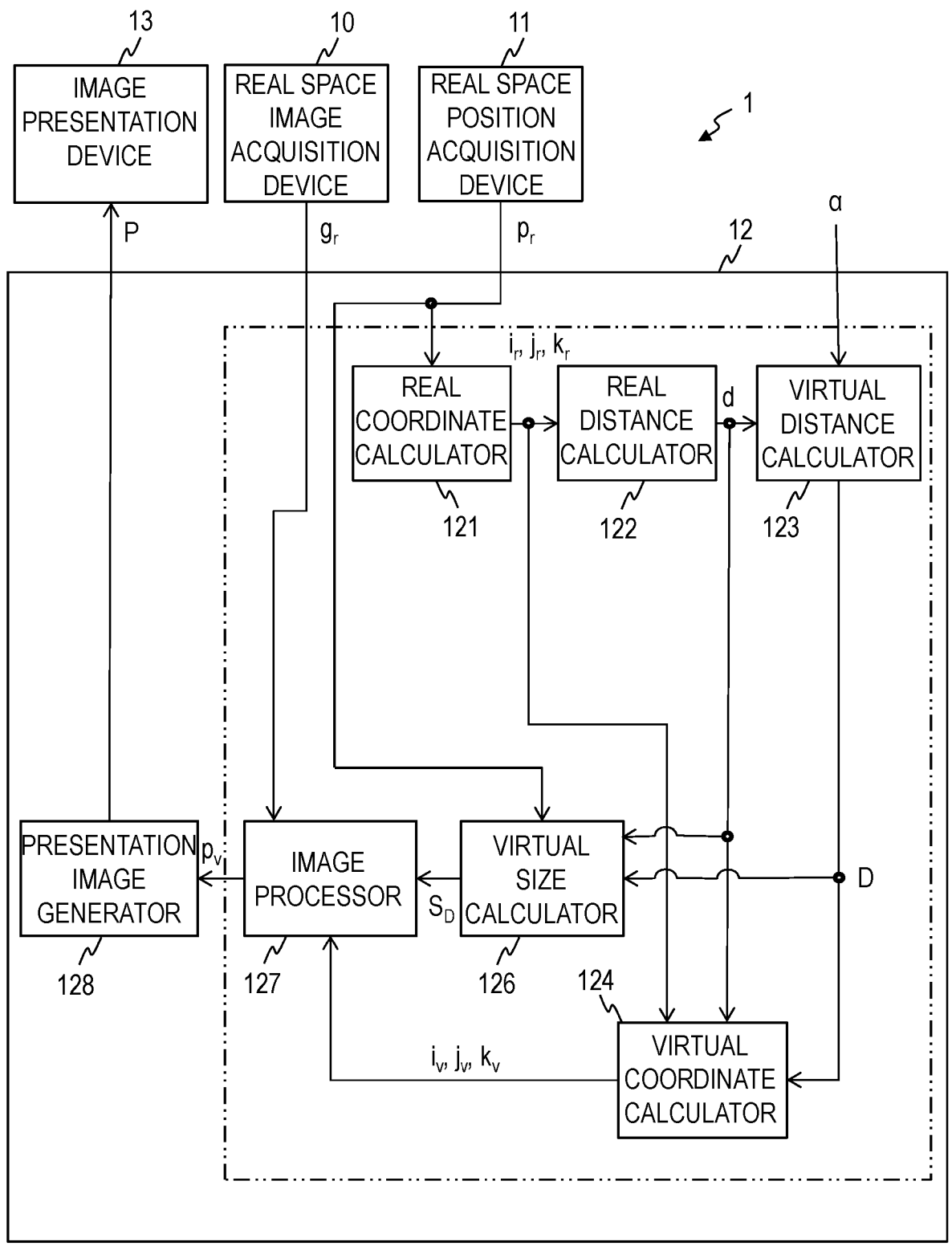
FIG. 1 is a block diagram illustrating a functional configuration of an image processing device of an embodiment.

As illustrated in FIG. 1, an image processing system 1 of the present embodiment includes a real space image acquisition device 10, a real space position acquisition device 11, an image processing device 12, and an image presentation device 13. The real space image acquisition device 10 acquires an image of an object present in a real space. The real space position acquisition device 11 acquires information on the position of the object present in the real space. For example, the real space image acquisition device 10 may be a device including a camera (e.g., an RGB camera) and the real space position acquisition device 11 may be a device including a position sensor (e.g., a depth sensor). For example, depth cameras such as Leap Motion (registered trademark) and Kinect (registered trademark) can be used as the real space image acquisition device 10 and the real space position acquisition device 11. The image processing device 12 illustrated in the present embodiment includes a real coordinate calculator 121, a real distance calculator 122, a virtual distance calculator 123, a virtual coordinate calculator 124, a virtual size calculator 126, an image processor 127, and a presentation image generator 128. The real coordinate calculator 121, the real distance calculator 122, the virtual distance calculator 123, the virtual coordinate calculator 124, the virtual size calculator 126, and the image processor 127 constitute a processor (visual object generator) which generates a virtual hand by enlarging or reducing a real hand. The image presentation device 13 is a device which presents an image for causing an observer to perceive a VR space. An example of the image presentation device 13 is a head mount display which presents a right-eye image and a left-eye image.

<Processing>

Processing of the present embodiment will be described.

<<Measurement of Position of Real Hand>>

The real space position acquisition device 11 acquires and outputs positional information $p_r$ representing a position of a real hand of an observer. The real coordinate calculator 121 of the image processing device 12 receives the positional information $p_r$ as an input and outputs coordinate values $i_r$, $j_r$ and $k_r$ representing a position $R[i_r, j_r, k_r]$ of the real hand of the observer in a real space. The coordinate values $i_r$, $j_r$ and $k_r$ illustrated in the present embodiment represent the position $R[i_r, j_r, k_r]$ of the real hand in an orthogonal coordinate system $R[x, y, z]$ of the real space having the position of an eye of the observer as an origin $R[0, 0, 0]$. In each embodiment, an example in which the origin O of any one (e.g., left eye) of the left eye and the right eye of the observer is used as the origin $R[0, 0, 0]$ will be described for convenience. Here, $i_r$, $j_r$ and $k_r$ are coordinate values on the horizontal axis, the vertical axis, and the depth axis of the orthogonal coordinate system of the real space, respectively. For example, when the positional information $p_r$ of the real hand acquired by the real space position acquisition device 11 is positional information represented through a coordinate system having a position sensor included in the real space position acquisition device 11 as the origin, the real coordinate calculator 121 converts the positional information of the real hand represented through the coordinate system having the position sensor as the origin, which is input thereto, into the coordinate values $i_r$, $j_r$ and $k_r$ of the real hand in the coordinate system $R[x, y, z]$ and outputs the converted coordinate values. The position $R[i_r, j_r, k_r]$ is, for example, a 3-dimensional center point of the real hand. In addition, the virtual size calculator 126 receives the positional information $p_r$ as an input, obtains a size $S_d$ (e.g., the linear dimension from L to L' of FIG. 4) of the real hand and outputs the size.

<<Processing of Acquiring Distance from Position of Eye of Observer to Real Hand>>

The real distance calculator 122 receives the coordinate values $i_r$, $j_r$ and $k_r$ as an input, calculates a distance d from the position (the origin $R[0, 0, 0]$) of an eye of the observer to the position of the real hand represented by the coordinate values $i_r$, $j_r$ and $k_r$ and outputs the distance d. Since the coordinate values $i_r$, $j_r$ and $k_r$ of the present embodiment represent the position $R[i_r, j_r, k_r]$ of the real hand in the coordinate system $R[x, y, z]$, the real distance calculator 122 may calculate the distance d according to formula (1) below.

$$d=\sqrt{i_r^2+j_r^2+k_r^2} \quad (1)$$

<<Processing of Determining Position of Virtual Hand>>

The virtual distance calculator 123 receives a parameter α and the aforementioned distance d as inputs, acquires a distance D from a position of a camera to a virtual hand in a VR space, which is represented by formula (2) below, and outputs the distance D.

$$D=\alpha \times d \quad (2)$$

Here, the parameter α is a positive real number that specifies how much times an apparent size of the virtual hand is the size of the real hand. α is set to α>1 when the virtual hand is caused to look larger than the real hand, that is, when a virtual giant hand is presented, and α is set to 0<α<1 when the virtual hand is caused to look smaller than the real hand, that is, when a virtual small hand is presented. When the virtual hand is caused to look the same size as the real hand, α is set to α=1. The parameter α may be input to the image processing device 12 from the outside or read from a storage (not shown) of the image processing device 12. In the present embodiment, α times the distance d is set to the distance D as represented by formula (2) in order to make the apparent size of the virtual hand α times the size of the real hand without causing the subjective quality of the virtual hand to be significantly different from the subjective quality of the real hand using size constancy.

Next, the virtual coordinate calculator 124 receives the aforementioned coordinate values $i_r$, $j_r$ and $k_r$ of the position $R[i_r, j_r, k_r]$, the distance d, and the distance D as inputs, determines and outputs coordinate values $i_v$, $j_v$ and $k_v$ of a position $V[i_v, j_v, k_v]$ of the virtual hand in the VR space. Here, the position $V[i_v, j_v, k_v]$ illustrated in the present embodiment is a position in an orthogonal coordinate system $V[x, y, z]$ of the VR space having a position of a camera of the VR space as an origin $V[0, 0, 0]$. In each embodiment, an example in which an origin $O_I$ at an imaging plane I of a specific camera of the VR space (e.g., a camera disposed on the left side between the aforementioned two cameras) is used as the origin $V[0, 0, 0]$ will be described for convenience. The position $V[i_v, j_v, k_v]$ of the virtual hand is, for example, a 3-dimensional center point of the virtual hand. Meanwhile, $i_v$, $j_v$ and $k_v$ are coordinate values on the horizontal axis, the vertical axis, and the depth axis of the orthogonal coordinate system of the VR space, respectively.

For example, the virtual coordinate calculator 124 may determine the coordinate values $i_v$, $j_v$, and $k_v$ of the virtual hand corresponding to the distance D according to formula (3) below.

$$i_v = D\frac{i_r}{d}, \; j_v = D\frac{j_r}{d}, \; k_v = D\frac{k_r}{d} \quad (3)$$

<<Processing of Determining Size of Virtual Hand>>

Processing of determining a size of the virtual hand will be described using FIG. 7A and FIG. 7B. The size of the real hand at the distance d from the origin O (i.e., the origin R[0, 0, 0]) of the real space (i.e., at the position $P_{r2}$ in FIG. 7A) is set to $S_d$, a visual angle formed by the real hand at the distance d from the origin O at the origin O of the real space is set to θ, and a visual angle obtained by bisecting the visual angle θ is set to $θ_{half}$=θ/2. In this case, the size $S_d$ of the real hand satisfies the following relational expression.

$$S_d = 2 \times d \times \tan θ_{half} \quad (4)$$

Here, to cause the visual angle of the virtual hand at the distance D from the origin $O_I$ (i.e., the origin V[0, 0, 0]) (i.e., at the position $P_{v2}$ in FIG. 7B) in the VR space to be identical to the visual angle θ of the real hand at the distance d from the origin O at the origin O of the real space, the size $S_D$ of the virtual hand needs to satisfy the following relational expression.

$$S_D = 2 \times D \times \tan θ_{half} \quad (5)$$

Further, although FIG. 7B illustrates a case of D>d, the size $S_D$ of the virtual hand needs to satisfy formula (5) even in a case of D≤d. To dispose the virtual hand at the position of the distance D from the origin $O_I$ and cause the visual angle thereof to be identical to the visual angle θ of the real hand, as described above, the size $S_D$ of the virtual hand should satisfy formula (5). The virtual size calculator 126 acquires the size $S_D$ of the virtual hand which satisfies the aforementioned formula (4) and formula (5) and outputs the size $S_D$. For example, the virtual size calculator 126 receives the positional information $p_r$ acquired by the real space position acquisition device 11, the distance d output from the real distance calculator 122, and the distance D output from the virtual distance calculator 123 as inputs, acquires the size $S_D$ of the virtual hand which satisfies formula (4) and formula (5) and outputs the size $S_D$. As an example, the virtual size calculator 126 obtains tan $θ_{half}$ on the basis of the positional information $p_r$ (obtains $S_d$ on the basis of the positional information $p_r$ and obtains tan $θ_{half}$ according to formula (4) using $S_d$ and d, as described above, for example), obtains $S_D$ according to formula (5) using tan $θ_{half}$ and D and outputs $S_D$.

The real space image acquisition device 10 acquires and outputs image information $g_r$ representing an image of the real hand of the observer. The image information $g_r$ acquired by the real space image acquisition device 10, the coordinate values $i_v$, $j_v$, and $k_v$ acquired by the virtual coordinate calculator 124, and the size $S_D$ of the virtual hand acquired by the virtual size calculator 126 are input to the image processor 127. The image processor 127 generates and outputs an image $p_v$ including the virtual hand that is a virtual hand imitating the real hand specified by the image information $g_r$, and is disposed at the position V[$i_v$, $j_v$, $k_v$] of the coordinate values $i_v$, $j_v$, and $k_v$ (for example, disposed having the position V[$i_v$, $j_v$, $k_v$] as a center point) and has the size $S_D$ in the VR space. A virtual hand imitating the real hand may mean, for example, a virtual hand that resembles or approximately resembles the real hand. The color of the virtual hand may be the same as the color of the real hand, for example.

<<Generation and Presentation of Presentation Image>>

The image $p_v$ output from the image processor 127 is input to the presentation image generator 128. The presentation image generator 128 generates and outputs a presentation image P for presenting the virtual hand (a virtual hand obtained by enlarging or reducing the real hand, which is disposed at the position v[$i_v$, $j_v$, $k_v$] and has the size $S_D$) viewed from the position (e.g., the origin $O_I$ or the imaging plane I) of the camera in the VR space to the observer using the image $p_v$. The presentation image P may be a still image or a moving image (video). An example of the presentation image P is a moving image of a prescribed frame rate (e.g., 30 Hz). The presentation image P may have, for example, a right-eye image and a left-eye image respectively to be presented to the right eye and the left eye of the observer. In the case of this example, the presentation image generator 128 installs two cameras in the VR space on which the image $p_v$ is displayed such that imaging directions of the two cameras are parallel to each other and faces the same direction and performs an imaging simulation for imaging the VR space with these cameras in order to acquire the right-eye image and the left-eye image. In this imaging simulation, imaging planes I of the two cameras are disposed on the same straight line and the horizontal distance between the cameras is set to a human inter-eye distance (about 6.5 cm) or near the same, for example. An image captured by a camera arranged on the left side is used as the left-eye image and an image captured by a camera arranged on the right side is used as the right-eye image. A known technology such as the aforementioned 3D modeling/rendering software may be used for the imaging simulation.

The image presentation device 13 receives the presentation image P as an input and presents the presentation image P to the observer. For example, when the image presentation device 13 is a head mount display and the presentation image P has a right-eye image and a left-eye image, a right-eye display of the head mount display presents the right-eye image and a left-eye display presents the left-eye image. Accordingly, the right-eye image is presented to the right eye of the observer wearing the head mount display and the left-eye image is presented to the left eye. The observer to which the presentation image P is presented recognizes the virtual hand in the VR space.

The visual angle formed by the virtual hand in the right-eye image and the left-eye image presented by the head mount display is the same as the visual angle formed by the real hand irrespective of the value of the aforementioned parameter α. However, when the aforementioned parameter α is α>1, the observer recognizes the virtual hand as a virtual giant hand according to the action of size constancy. When 0<α<1, the observer recognizes the virtual hand as a virtual small hand according to the action of size constancy. When α=1, the observer recognizes the virtual hand as a virtual ordinary hand according to the action of size constancy. Here, the visual angle formed by the virtual hand in the right-eye image and the left-eye image presented by the head mount display is the same as the visual angle formed by the real hand irrespective of the value of α, as described above. Accordingly, the apparent quality of the virtual giant hand, the virtual small hand and the virtual ordinary hand in the right-eye image and the left-eye image presented by the head mount display are not significantly different from the apparent quality of the real hand irrespective of the value of α. That is, the surface shape of the virtual giant hand is not excessively rough when $\alpha>1$ or the surface shape of the virtual small hand is not excessively fine when $0<\alpha<1$. In addition, the virtual giant hand does not protrude from a spatial range displayed on the head mount display.

Modified Example of First Embodiment

In the first embodiment, the virtual size calculator 126 obtains $S_D$ according to formula (5) and outputs $S_D$. Satisfying the aforementioned formula (4) and formula (5) is equivalent to satisfying formula (6A) and formula (6B) below.

$$S_D/S_d = D/d \tag{6A}$$

$$S_D = S_d \times D/d \tag{6B}$$

In addition, since $D/d = \alpha$ as can be ascertained from formula (2), formula (6A) and formula (6B) are equivalent to formula (6C) and formula (6D) below.

$$S_D/S_d = \alpha \tag{6C}$$

$$S_D = S_d \times \alpha \tag{6D}$$

Accordingly, although the virtual size calculator 126 obtains $S_D$ according to formula (4) and formula (5) and outputs $S_D$ in the first embodiment, the virtual size calculator 126 may output a value obtained by multiplying $S_d$ by $D/d$ as $S_D$ or the virtual size calculator 126 may output a value obtained by multiplying $S_d$ by $\alpha$ as $S_D$. For example, the virtual size calculator 126 may obtain $S_d$ on the basis of the input positional information $p_r$ and output a value obtained by multiplying the obtained $S_d$ by $\alpha$ input thereto as $S_D$. Alternatively, the virtual size calculator 126 may obtain $S_d$ on the basis of the input positional information $p_r$, calculate $S_D$ according to formula (6B) using the obtained $S_d$ and D and d input thereto and output $S_D$.

Second Embodiment

In software for realizing virtual reality, the size of a model of an object in a VR space can be set to a ratio to the size of a reference object. The size of a virtual hand may be set to $\alpha$ times the size of a real hand using such software. However, such existing software does not change the size of a model of an object while maintaining a visual angle of the object. In a second embodiment, the function of this software (referred to as "VR software") is used. Hereinafter, description will be given focusing on differences from the matters described so far, and the matters that have already been described are designated by the same reference numerals and description thereof will be omitted.

<Configuration>

Figure 8:
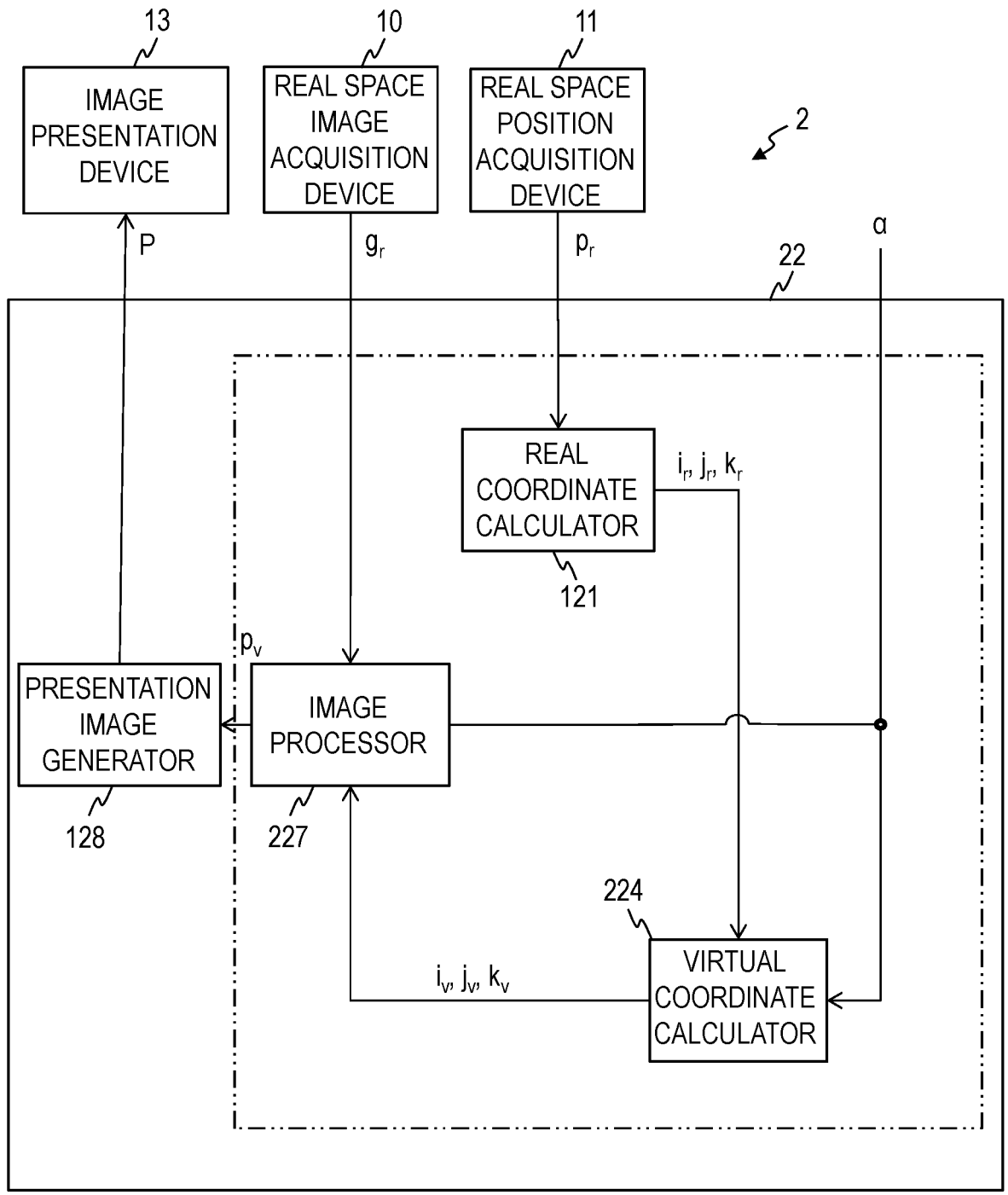
FIG. 8 is a block diagram illustrating a functional configuration of an image processing device of an embodiment.

As shown in FIG. 8, an image processing system 2 of the present embodiment includes the real space image acquisition device 10, the real space position acquisition device 11, an image processing device 22, and the image presentation device 13. The image processing device 22 includes the real coordinate calculator 121, a virtual coordinate calculator 224, an image processor 227, and the presentation image generator 128. The real coordinate calculator 121, the virtual coordinate calculator 224 and the image processor 227 constitute a processor (visual object generator) which generates a virtual hand by enlarging or reducing a real hand.

<Processing>

Processing of the present embodiment will be described.

<<Measurement of Position of Real Hand>>

The same as the first embodiment applies. That is, the real space position acquisition device 11 acquires positional information $P_r$ representing the position of a real hand of an observer in a real space and outputs the positional information $P_r$. The real coordinate calculator 121 receives the positional information $p_r$ as an input, acquires and outputs coordinate values $i_r$, $j_r$, and $k_r$ representing a position $R[i_r, j_r, k_r]$ of the real hand of the observer.

<<Processing of Determining Position of Virtual Hand>>

Since $\alpha = D/d$, formula (3) can be modified into formula (7) below.

$$i_v = i_r \times \alpha, j_v = j_r \times \alpha, k_v = k_r \times \alpha \tag{7}$$

The virtual coordinate calculator 224 receives the coordinate values $i_r$, $j_r$, and $k_r$ of the position $R[i_r, j_r, k_r]$ acquired by the real coordinate calculator 121 and the input parameter $\alpha$ as inputs, acquires coordinate values $i_v$, $j_v$ and $k_v$ of a position $V[i_v, j_v, k_v]$ of a virtual hand according to formula (7) and outputs the coordinate values $i_v$, $j_v$ and $k_v$. An example of the position $V[i_v, j_v, k_v]$ of the virtual hand is a 3-dimensional center point of the virtual hand.

<<Processing of Determining Size of Virtual Hand>>

The real space image acquisition device 10 acquires and outputs image information $g_r$ representing an image of the real hand of the observer. The input parameter $\alpha$, the input image information $g_r$ acquired by the real space image acquisition device 10, and the coordinate values $i_v$, $j_v$ and $k_v$ acquired by the virtual coordinate calculator 224 are input to the image processor 227. The image processor 227 generates and outputs an image $p_v$ including a virtual hand that is a virtual hand obtained by enlarging or reducing a virtual ordinary hand imitating the real hand specified by the image information $g_r$, and is disposed at the position $V[i_v, j_v, k_v]$ of the coordinate values $i_v$, $j_v$ and $k_v$ (for example, having the position $V[i_v, j_v, k_v]$ as a center point) and has a size of $\alpha$ times the virtual ordinary hand in the VR space. Here, to generate a virtual hand having a size of $\alpha$ times the virtual ordinary hand, $\alpha$ should be designated in the aforementioned VR software. When the size of the real hand is set to $S_d$, the size $S_D$ of the virtual hand generated in this manner also satisfies the relation of formula (6).

<<Generation and Presentation of Presentation Image>>

The same as the first embodiment applies.

Third Embodiment

Figure 9:
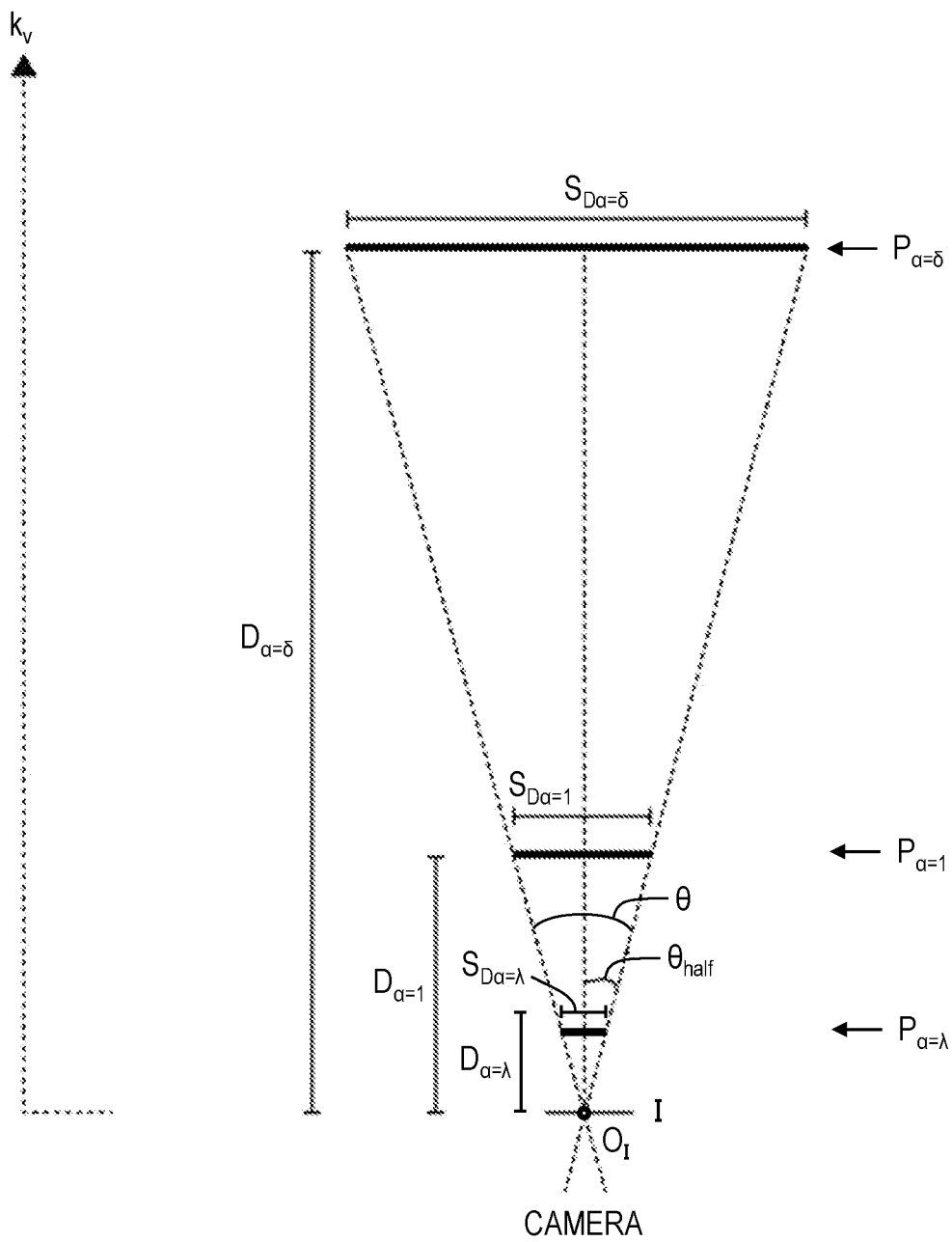
FIG. 9 is a schematic diagram illustrating a state in which the depth of an object has been changed in a virtual space.

In the first embodiment, the modified example of the first embodiment, and the second embodiment, the value of the parameter $\alpha$ may be changed. Accordingly, it is possible to change the apparent size of the virtual hand without significantly changing the subjective quality of the virtual hand. FIG. 9 illustrates a state in which the parameter $\alpha$ has been changed and the depth distance $k_v$ of the virtual hand has been changed when the visual angle formed by the real hand at the origin O of the real space is $\theta$ in the VR space. Here, the depth distance $k_v$ of the virtual hand when $\alpha=1$ is set to $D_{\alpha=1}$, the depth distance $k_v$ of the virtual hand when $\alpha=\delta$ is set to $D_{\alpha=\delta}$, and the depth distance $k_v$ of the virtual hand when $\alpha=\lambda$ is set to $D_{\alpha=\lambda}$. Here, $0<\lambda<1<\delta$. A size of the virtual hand at the distance $D_{\alpha=1}$ from the origin $O_I$ (i.e., at a position $P_{\alpha=1}$ in FIG. 9) is set to $S_{D\alpha=1}$, a size of the virtual hand at the distance $D_{\alpha=\delta}$ from the origin $O_I$ (i.e., at a position $P_{\alpha=\delta}$ in FIG. 9) is set to $S_{D\alpha=\delta}$, and a size of the virtual hand at the distance $D_{\alpha=\lambda}$ from the origin $O_I$ (i.e., at a position $P_{\alpha=\lambda}$ in FIG. 9) is set to $S_{D\alpha=\lambda}$. Here, when $S_D=S_{D\alpha=1}$ and $D=D_{\alpha=1}$, the relation of the aforementioned formula (5) is satisfied. Similarly, the relation of the aforementioned formula (5) is satisfied when $S_D=S_{D\alpha=\delta}$ and $D=D_{\alpha=\delta}$, and the relation of the aforementioned formula (5)

is satisfied when $S_D=S_{D\alpha=\lambda}$ and $D=D_{\alpha=\lambda}$. As illustrated in FIG. 9, both the depth distance and the size of the virtual hand increase with the visual angle θ maintained by increasing the value of α. Specifically, when the value of α is multiplied by δ, both the depth distance $k_v$ and the size of the virtual hand are multiplied by δ with the visual angle θ maintained. On the contrary, both the depth distance $k_v$ and the size of the virtual hand decrease with the visual angle θ maintained by decreasing the value of α. Specifically, when the value of α is multiplied by λ, both the depth distance $k_v$ and the size of the virtual hand are multiplied by λ with the visual angle θ maintained. Accordingly, it is possible to change the apparent size of the virtual hand without significantly changing the subjective quality of the virtual hand. For example, it is possible to change a virtual ordinary hand to a virtual giant hand by changing α=1 to α=δ without significantly changing the subjective quality of the virtual hand. Alternatively, it is possible to change a virtual ordinary hand to a virtual small hand by changing α=1 to α=λ without significantly changing the subjective quality of the virtual hand. Alternatively, it is possible to change a virtual giant hand or a virtual small hand to a virtual ordinary hand by changing α=δ or α=λ to α=1 without significantly changing the subjective quality of the virtual hand.

Meanwhile, the value of the parameter α input to the image processing device may be changed (changed aspect 1) or any operation may be performed on the value of the parameter α input to or stored in the image processing device to change the value of the parameter α (changed aspect 2). In an example of changed aspect 1, a left arrow key and a right arrow key of a keyboard of a personal computer or the like are used as interfaces and they are set such that α decreases when the left arrow key is pressed and α increases when the right arrow key is pressed. For example, when a virtual hand corresponding to the parameter α that satisfies α≥1 is intended to be set to a virtual small hand, an observer presses the left arrow key to set α to a value that satisfies 0<α<1. For example, when a virtual hand corresponding to the parameter α that satisfies 0<α≤1 is intended to be set to a virtual giant hand, the observer presses the right arrow key to set α to a value that satisfies α>1. When a virtual hand corresponding to the parameter α that satisfies α≠1 is intended to be set to a virtual ordinary hand, the right arrow key or the left arrow key is pressed to set α to α=1. Actually used keys may be arbitrary two keys as well as the left and right arrow keys. In addition, the value of the parameter α may be changed, for example, according to an input using a mouse, an input to a touch panel of a smartphone terminal device or the like, an input through a game controller, an audio input, an input using a non-contact input device, and the like. As the changed aspect 2, for example, an aspect in which the size of α monotonously increases or monotonously decreases with the elapse of time, periodically changes with the elapse of time, randomly varies, discontinuously varies, or varies in response to other processing results can be exemplified.

In addition, the parameter α may be a value in response to the depth distance $k_r$ of the real hand. For example, the image processing device may set the value of the parameter α to $α_1$ (here, $α_1$ is a positive value) when the depth distance $k_r$ of the real hand is a predetermined depth distance (predetermined distance) $K_1$ (here, $K_1$ is a positive value) and set the value of the parameter α to $α_2$ (here, $α_2$ is a positive value different from $α_1$) when the depth distance $k_r$ of the real hand is $K_2$ (here, $K_2$ is a positive value different from $K_1$). For example, a relational expression $FNC(k_r)$ of the depth distance $k_r$ of the real hand may be set to α. That is, α=$FNC(k_r)$ may be set. In this example, $FNC(k_r)$ may be set to α=1 when the depth distance $k_r$ of the real hand is the predetermined distance $K_1$ or may be set to α=1 when the depth distance $k_r$ of the real hand holds $0 \le k_r \le K_1$. In addition, for example, $FNC(k_r)$ may satisfy $FNC(K_{22})>FNC(K_{21})$ for $k_r=K_{21}$ and $k_r=K_{22}$ (here, $K_{22}>K_{21}$). In this example, $FNC(K_{22})$ when an excess of $k_r=K_{22}$ for $K_1$ is $K_{22}-K_1$ is greater than $FNC(K_{21})$ when an excess of $k_r=K_{21}$ for $K_1$ is $K_{21}-K_1$. Since $K_{22}>K_{21}$, the excess $K_{22}-K_1$ is greater than the excess $K_{21}-K_1$. For example, $FNC(k_r)$ may monotonously increase for increase of $k_r$ in the range of $K_1<k_r$ or may not decrease (monotonously increase in the broad sense) for increase of $k_r$ in the range of $K_1<k_r$. In addition, $FNC(k_r)$ may be set to a continuous function, and it is desirable that $FNC(k_r)$ be a continuous function monotonously increasing for increase of $k_r$. For example, a maximum value of the depth distance $k_r$ of the real hand (e.g., a maximum distance that the real hand reaches (e.g., 1 m)) may be set to $K_{max}$ (here, $K_{max}>K_1$), a function value when $k_r=K_{max}$ may be set to $FNC(K_{max})=α_0$ (here, $α_0>1$), and a value obtained by performing linear interpolation between $FNC(K_1)=1$ and $FNC(K_{max})=α_0$ may be set to $FNC(k_r)$ (here, $K_1<k_r \le K_{max}$). $FNC(k_r)$ is represented as formula (8).

$$FNC(k_r)=1+(α_0-1)\times(k_r-K_1)/(K_{max}-K_1) \qquad (8)$$

For example, in the case of an example in which α=1 when $0 \le k_r \le K_1$, α=$FNC(K_2)$ when $K_1<K_2=k_r$, and $FNC(K_2)$ monotonously increases for increase of $K_2$, a virtual hand looks as follows. That is, when the depth distance $k_r$ of the real hand is equal to or less than $K_1$ (e.g., equal to or less than 30 cm from an eye), the virtual hand looks as large as the real hand at the same depth (e.g., 30 cm from the eye) as the real hand (α=1). On the other hand, when the depth distance $k_r$ of the real hand exceeds $K_1$, the virtual hand looks further away than the real hand and larger than the real hand as the real hand becomes far away from the eye (α gradually increases as $k_r$ increases).

Other Modified Examples

Meanwhile, the present invention is not limited to the above-described embodiments and the modified examples thereof. For example, in the above-described embodiments and the modified examples thereof, examples in which the distance from the origin O in the real space to the center point of the 3D shape of the real hand is set to d and the distance from the origin $O_I$ of the camera in the VR space to the center point of the 3D shape of the virtual hand is set to D have been shown. However, the distance from the origin O to any other point of the 3D shape of the real hand may be set to d and the distance from the origin $O_I$ to any other point of the 3D shape of the virtual hand may be set to D. In addition, the distance from the origin $O_I$ to each point of the 3D shape of the virtual hand may be set on the basis of the distance from the origin O to each point of the 3D shape of the real hand. Further, although an example in which a point positioned inside the crystalline lens of an eye is set to the origin O has been shown in the above-described embodiments and the modified examples thereof, another position of the eye or a position near the eye may be set to the origin O. In addition, although an example in which the origin O of the eye is set to the origin R[0, 0, 0] has been described in the above-described embodiments and the modified examples thereof, a vicinity of the origin O of the eye may be set to the origin R[0, 0, 0] or another point at a fixed relative position with respect to the origin O of the eye may be set to the origin R[0, 0, 0]. Similarly, although an example in which the focal point of the imaging plane I of the camera of the VR space is set to the origin $O_I$ has been shown in the above-described embodiments and the modified examples thereof, another position on the imaging plane I of the camera or a position near the imaging plane I may be set to the origin $O_I$. In addition, although an example in which the origin $O_I$ is set to the origin V[0, 0, 0] has been shown in the above-described embodiments and the modified examples thereof, a vicinity of the origin $O_I$ may be set to the origin V[0, 0, 0] or another point at a fixed relative position with respect to the origin $O_I$ may be set to the origin V[0, 0, 0]. Further, an example in which the image processor 127 generates the image $p_v$ including the virtual hand having the position $V[i_v, j_v, k_v]$ as the center point has been shown in the above-described embodiments and the modified examples thereof. However, the position $V[i_v, j_v, k_v]$ may be set to another position on the virtual hand or set to a relative position with respect to the virtual hand. In addition, in the above-described embodiments and the modified examples thereof, the distance from the tip of the thumb of the right hand to the base of the little finger of the right hand is set to the reference distance for convenience. However, a distance of another portion of a hand may be set to the reference distance.

Although the parameter α is a real variable in the above-described embodiments and the modified examples thereof, the parameter α may be a positive real constant. That is, the parameter α that is a constant may be set in the image processing device in advance and the image processing device may perform the above-described processing using this parameter α.

In the above-described embodiments and the modified examples thereof, a model of a virtual hand that imitates a real hand of an observer (man) is disposed in a VR space. However, any 3D shape model (an aggregate of polygons) instead of the model of such a virtual hand may be disposed in the VR space. That is, in the above-described embodiments and the modified examples thereof, "virtual hand" may be substituted by any 3D shaped object (referred to as "virtual 3D shaped object") in the VR space, "virtual ordinary hand" may be substituted by "virtual ordinary 3D shaped object", "virtual giant hand" may be substituted by "virtual giant 3D shaped object", "virtual small hand" may be substituted by "virtual minimal 3D shaped object", and the above-described processing may be executed. Here, "virtual ordinary 3D shaped object" refers to a virtual 3D shaped object perceived by an observer to have the same apparent size as a real hand. "Virtual giant 3D shaped object" refers to a virtual 3D shaped object perceived by an observer to be larger than a real hand. "Virtual minimal 3D shaped object" refers to a virtual 3D shaped object perceived by an observer to be smaller than a real hand. "An observer perceives that a virtual 3D shaped object has the same apparent size as a real hand" may mean that the observer perceives that a reference distance of a reference part of the real hand is the same as a linear dimension of the virtual 3D shaped object, for example. "An observer perceives that a virtual 3D shaped object is larger than a real hand" may mean that the observer perceives that a linear dimension of the virtual 3D shaped object is greater than a reference distance of a reference part of the real hand, for example. "An observer perceives that a virtual 3D shaped object is smaller than a real hand" may mean that the observer perceives that a linear dimension of the virtual 3D shaped object is less than a reference distance of a reference part of the real hand, for example. "A linear dimension of a 3D shaped object" may be defined in any manner. Examples of "a linear dimension of a 3D shaped object" include external dimensions of a specific portion of the 3D shaped object, a maximum value of external dimensions of the 3D shaped object, a minimum value of the external dimensions of the 3D shaped object, an average of the external dimensions of the 3D shaped object, and the like. When an arbitrary 3D shape model is disposed in the VR space instead of the model of the virtual hand, the real space image acquisition device 10 is omitted and the arbitrary 3D shape model is input to the image processor 127 or 227 instead of the image information $g_r$. In this case, the image processor 127 or 227 generates the image $p_v$ using the arbitrary 3D shape model instead of the image information $g_r$ and outputs the image $p_v$. The arbitrary 3D shape model may be input from the outside of the image processing device or read from the storage (not shown) of the image processing device. Accordingly, it is possible to present a virtual 3D shaped object moving in the VR space in response to a motion of a real hand to an observer and to cause the virtual 3D shaped object to look large or small in response to the value of the parameter α without significantly changing the subjective quality of the virtual 3D shaped object. For example, it is possible to present a virtual giant 3D shaped object moving in the VR space in response to a motion of the real hand by setting the value of the parameter α to α>1. It is possible to present a virtual minimal 3D shaped object moving in the VR space in response to a motion of the real hand by setting the value of the parameter α to 0<α≤1. Further, it is possible to present a virtual ordinary 3D shaped object moving in the VR space in response to a motion of the real hand by setting the value of the parameter α to α=1. In addition, it is possible to cause a virtual 3D shaped object moving in the VR space in response to a motion of the real hand to look large or small without significantly changing an apparent quality perceived by an observer by changing the parameter α. Further, "virtual 3D shaped object" may or may not be an object imitating any visual object in a real space, or may or may not be an object representing a visual object present in the real space. Examples of "virtual 3D shaped object" include an aggregate of polygons representing a robot arm, an aggregate of polygons representing a tool operated by a hand, such as a hammer or tongs, and the like. Further, an aggregate of polygons representing an object that does not normally move in connection with a motion of a real hand may be set to a "virtual 3D shaped object". For example, an aggregate of polygons representing a tiger may be set to a "virtual 3D shaped object".

In the above-described embodiments and the modified examples thereof, examples in which the coordinate values $i_v$, $j_v$ and $k_v$ of the position $V[i_v, j_v, k_v]$ of the virtual hand in the VR space and the size $S_D$ of the virtual hand are obtained on the basis of the coordinate values $i_r$, $j_r$ and $k_r$ of the position $R[i_r, j_r, k_r]$ of the real hand in the real space have been shown. However, the position of a virtual 3D shaped object and the size of the virtual 3D shaped object can be obtained from only the parameter α independently of the position of the real hand if the typical relationship between the distance d and the visual angle θ can be estimated. For example, if a visual angle θ formed by a visual object at a position of a specific distance (specific distance) d (e.g., d=1) from an observer can be estimated, a virtual 3D shaped object that forms the estimated visual angle (estimated visual angle) θ and has a size $S_D$ in response to the parameter α can be presented in the VR space. The size $S_D$ of the virtual 3D shaped object may be, for example, the aforementioned "linear dimension of the 3D shaped object".

Further, it is possible to cause the virtual 3D shaped object to look large or small without significantly changing the apparent quality of the virtual 3D shaped object by changing the value of the parameter α. For example, if the image processing device can estimate a visual angle formed by a visual object present at the specific distance d from the origin O, the image processing device can set a visual angle obtained by bisecting the estimated visual angle (estimated visual angle) θ to $\theta_{half}$ and obtain $S_d$ on the basis of formula (4) using the specific distance d and $\theta_{half}$. Further, the image processing device can obtain the distance D on the basis of formula (2) using the parameter α and the specific distance d. Moreover, the image processing device can calculate $S_D$ according to formula (5) using the aforementioned visual angle $\theta_{half}$ obtained by bisecting the estimated visual angle θ and the distance D. The image processing device can generate an image $p_v$ including a 3D shaped object having a size of $S_D$ at the distance D from the origin $O_I$ of the camera in the VR space using the distance D and the size $S_D$ acquired in this manner. As described above, a visual angle formed by the 3D shaped object acquired in this manner is identical to the estimated visual angle θ all the time. For example, since the sizes of rubber erasers have not much individual differences, an estimated visual angle θ formed by a rubber eraser present at a position separated from an observer by an arbitrary specific distance d can be estimated from a typical size of rubber erasers. Accordingly, when an aggregate of polygons representing a rubber eraser is set to a 3D shaped object, the image processing device can generate an image $p_v$ including the aggregate of polygons representing the rubber eraser that forms the estimated visual angle θ at the origin $O_I$ and has the size $S_D$ corresponding to the parameter α in the VR space independently of the position of the rubber eraser in the real space.

Similarly, if a distance d formed by a visual object that forms a specific visual angle θ (e.g., θ=10°) can be estimated, it is possible to obtain the position of a virtual 3D shaped object in the VR space and the size of the virtual 3D shaped object from only the parameter α independently of the position of a real hand. That is, if an observer can estimate the distance (estimated distance) d of the visual object that forms the specific visual angle θ, a virtual 3D shaped object that forms the specific visual angle θ at the origin $O_I$ and has a size $S_D$ in response to the parameter α can be presented in the VR space. Further, it is possible to cause the virtual 3D shaped object to look large or small without significantly changing the apparent quality of the virtual 3D shaped object by changing the value of the parameter α. For example, the image processing device can estimate an estimated distance d of a visual object that forms a specific visual angle θ by the observer, set a visual angle obtained by bisecting the specific visual angle θ to $\theta_{half}$ and obtain $S_D$ on the basis of formula (4) using the estimated distance d and $\theta_{half}$. Further, the image processing device can obtain the distance D on the basis of formula (2) using the parameter α and the estimated distance d. In addition, the image processing device can calculate $S_D$ according to formula (5) using the visual angle $\theta_{half}$ obtained by bisecting the aforementioned visual angle θ and the distance D. The image processing device can generate an image $p_v$ including a 3D shaped object having the size $S_D$ at the distance D from the origin $O_I$ of the camera in the VR space using the distance D and the size $S_D$ acquired in this manner.

In addition, in the above-described embodiments and the modified examples thereof, a real hand may be substituted by other visual objects in the real space. For example, the real hand may be substituted by other parts of an observer in the real space, such as the head and a foot, objects other than the observer, such as a ball and a vehicle in the real space, an image displayed in the real space, and the like.

Furthermore, the color of a virtual hand may be a color other than the color of a real hand in accordance with the color of the real hand or a color unrelated to the color of the real hand.

The above-described various types of processing may be executed in parallel or individually according to processing capability of an apparatus that executes processing or as necessary as well as being executed in a time series as described. In addition, appropriate modification can be made without departing from the scope of the present invention.

SUMMARY

The above-described embodiments and the modified examples thereof are summarized.

As described above, the image processing device enlarges or reduces a "first object" in a real space or a virtual reality space to generate a "second object" that is a visual object in the virtual reality space (VR space). Examples of the "first object" include a visual object in the "real space" in addition to a real hand, a virtual 3D shaped object imitating a visual object in the "real space", a virtual 3D shaped object representing a visual object that is not present in the "real space", and the like. Examples of the "second object" include a virtual hand, a virtual 3D shaped object, and the like.

However, a "first visual angle (e.g., a visual angle θ)" formed by the "first object" at a "real observation position (e.g., an origin O)" in the real space or a "virtual observation position (e.g., an origin $O_I$)" in the "virtual reality space" is the same as a "second visual angle (e.g., a visual angle θ)" formed by the "second object" at the "virtual observation position" (FIG. 7A, FIG. 7B and FIG. 9). Here, when the "second object" is obtained by enlarging the "first object", a "second distance (e.g., a distance D or a distance $D_{\alpha=\delta}$)" that is a distance from the "virtual observation position" to the "second object" is longer than a "first distance (e.g., a distance d or a distance $D_{\alpha=1}$)" that is a distance from the "real observation position" or the "virtual observation position" to the "first object" (FIG. 7A, FIG. 7B and FIG. 9). On the other hand, when the "second object" is obtained by reducing the "first object", the "second distance (e.g., a distance D or a distance $D_{\alpha=\lambda}$)" is shorter than the "first distance (e.g., the distance d or the distance $D_{\alpha=1}$)" (FIG. 9). For example, a ratio of the "second distance" to the "first distance" (e.g., D/d, $D_{\alpha=\delta}/D_{\alpha=1}$ or $D_{\alpha=\lambda}/D_{\alpha=1}$) is the same as a ratio (e.g., $S_D/S_d$, $S_{D\alpha=\delta}/S_{D\alpha=1}$ or $S_{D\alpha=\lambda}/S_{D\alpha=1}$) of the linear dimension (e.g., $S_D$, $S_{D\alpha=\delta}$ or $S_{D\alpha=\lambda}$) of the "second object" to the linear dimension (e.g., $S_D$ or $S_{D\alpha=1}$) of the "first object" (Formula (6)). Further, the image processing device may generate a presentation image P for presenting the "second object" viewed from the "virtual observation position (e.g., the origin $O_I$ or the imaging plane I)" in the "virtual reality space" to an observer. The presentation image P is presented to the observer through an image presentation device.

For example, when the "first object" is a visual object in the "real space" or an object imitating a visual object in the "real space", a "visual angle (e.g., visual angle θ)" formed by the "first object" is a "visual angle" formed by a visual object in the "real space" at the "real observation position (e.g., the origin O)", and the "first distance (e.g., $k_r$)" is a distance from the "real observation position" to the visual object in the "real space", a ratio of the "second distance" to the "first distance" (e.g., α=FNC($K_{22}$)) when an excess (e.g., $K_{22}$-$K_1$) of the "first distance (e.g., $k_r$=$K_{22}$)" with respect to a predetermined distance (e.g., $K_1$) is a "first value" may be greater than a ratio of the "second distance" to the "first distance" (e.g., α=FNC($K_{21}$)) when an excess (e.g., $K_{21}$-$K_1$) of the "first distance ($k_r$=$K_{21}$)" with respect to the "predetermined distance (e.g., $K_1$)" is a "second value". Here, the "first value" is greater than the "second value". For example, the ratio of the "second distance" to the "first distance" increases as the excess of the "first distance" with respect to the "predetermined distance" increases.

As described above, if a visual angle formed by the "first object" at the "real observation position" can be estimated even independently of the position of the visual object in the real space, the "second object" may be generated such that the "first visual angle" that is the estimated visual angle (e.g., θ) is the same as the "second visual angle" formed by the "second object" at the "virtual observation position".

In addition, if a distance from an "observation position" to the "first object" can be estimated even independently of the position of the visual object in the real space, the estimated distance (e.g., d) may be set to the "first distance" instead of the distance from the "real observation position" to the "first object".

Meanwhile, the "first visual angle" may not be strictly the same as the "second visual angle" and the "first visual angle" may be approximately the same as the "second visual angle". For example, a difference between the "first visual angle" and the "second visual angle" may be equal to or less than ε% of the "first visual angle" (e.g., 1%, 3%, 5%, 7%, or the like).

Furthermore, the ratio of the "second distance" to the "first distance" may not be strictly the same as the ratio of the linear dimension of the "second object" to the linear dimension of the "first object" and they may be approximately the same as each other. For example, a difference therebetween may be equal to or less than μ% (e.g., 1%, 3%, 5%, 7%, or the like) of the ratio of the "second distance" to the "first distance".

Configuration Example of Image Processing Device, and the Like

The above-described image processing device may be configured by executing a predetermined program by a general-purpose or dedicated computer including a processor (hardware processor) such as a central processing unit (CPU), a memory such as and a random-access memory (RAM) and a read-only memory (ROM), and the like, for example. This computer may include a single processor and a memory or include a plurality of processors and memories. This program may be installed in the computer or recorded on a ROM or the like in advance. In addition, some or all processors may be configured using an electronic circuit (circuitry) which realizes processing functions without using a program instead of an electronic circuit which realizes a functional configuration by reading a program, such as a CPU. An electronic circuit constituting a single device may include a plurality of CPUs.

When the configuration of the image processing device is realized by a computer, details of processing of functions to be included in the image processing device are described by a program. The above-described processing functions are realized on the computer by executing the program through the computer. The program describing the details of processing can be recorded on a computer-readable recording medium. An example of the computer-readable recording medium is a non-transitory recording medium. Examples of such a recording medium include a magnetic recording device, an optical disc, a magneto-optical recording medium, a semiconductor memory, and the like.

Distribution of this program may be performed, for example, by selling, transferring or lending a portable recording medium on which the program is recorded, such as a DVD or a CD-ROM. Further, a configuration in which the program is distributed in such a manner that the program is stored in a storage device of a server computer and the program is transmitted from the server computer to another computer via a network may be employed.

For example, a computer which executes such a program stores a program recorded on a portable recording medium or a program transmitted from a server computer in a storage device thereof first. At the time of execution of processing, this computer reads the program stored in the storage device thereof and executes processing according to the read program. In other aspects of execution of this program, the computer may directly read the program from the portable recording medium and executes processing according to the program. Further, whenever the program is transmitted to the computer from the server computer, processing may be sequentially executed according to received programs. A configuration in which the above-described processing is executed according to, a so-called application service provider (ASP) type service that realizes a processing function according to only an execution instruction and result acquisition without transmitting the program to the computer from the server computer may be employed.

It may be possible to realize at least some of processing functions of the present apparatus using hardware instead of realizing the processing functions by executing a predetermined program on a computer.

INDUSTRIAL APPLICABILITY

As described above, in the present technology, it is possible to present a visual object in a VR space, which is obtained by enlarging or reducing a certain object, to an observer without significantly changing an apparent quality perceived by the observer using size constancy. Accordingly, it is possible to realize an application of operating a VR space by a virtual giant hand or a virtual small hand without causing an apparent quality to be significantly different from a real hand, for example. In addition, when a model of a virtual hand is already present, for example, it is also possible to present a virtual giant hand, a virtual small hand, and the like using the existing model of the virtual hand without newly creating a model having a different size from the existing model of the virtual hand. This technology can be used in all fields using virtual reality (for example, games, video work, education, medical treatment, etc.)

REFERENCE SIGNS LIST 1, 2 Image processing system
12, 22 Image processing device

The invention claimed is:
1. An image processing device comprising processing circuitry configured to implement a visual object generator which generates a second object that is a visual object in a virtual reality space, the second object being a virtual object corresponding to one obtained by enlarging or reducing a first object, wherein
an angle for a particular object at an observation position between one end of the particular object observed from an observation position and an opposite end of the particular object observed from the observation position is referred to as a visual angle formed by the particular object, a first visual angle that is a visual angle or an estimated visual angle formed by the first object at a real observation position in a real space or a virtual observation position in the virtual reality space is same as a second visual angle that is a visual angle formed by the second object at the virtual observation position, when the second object is the virtual object corresponding to one obtained by enlarging the first object, a second distance that is a distance from the virtual observation position to a center point of 3D shape of the second object is longer than a first distance that is a distance or an estimated distance from the real observation position or the virtual observation position to a center point of 3D shape of the first object, and when the second object is the virtual object corresponding to one obtained by reducing the first object, the second distance is shorter than the first distance.

2. The image processing device according to claim 1, wherein the visual object generator changes a size of the second object and the second distance in the virtual reality space while maintaining the second visual angle the same.

3. The image processing device according to claim 1, wherein the first object is a visual object in the real space or an object imitating a visual object in the real space, wherein the first visual angle formed by the first object is a visual angle formed by the visual object in the real space at the real observation position, and wherein the first distance is a distance from the real observation position to the visual object in the real space.

4. The image processing device according to claim 1, further comprising processing circuitry configured to implement a presentation image generator which generates a presentation image for presenting the second object viewed from the virtual observation position in the virtual reality space to an observer.

5. A non-transitory computer-readable recording medium storing a program for causing a computer to function as the image processing device according to claim 1.

6. An image processing device comprising processing circuitry configured to implement a visual object generator which generates a second object that is a visual object in a virtual reality space, the second object being a virtual object corresponding to one obtained by enlarging or reducing a first object, wherein a first visual angle that is a visual angle or an estimated visual angle formed by the first object at a real observation position in a real space or a virtual observation position in the virtual reality space is same or approximately same as a second visual angle that is a visual angle formed by the second object at the virtual observation position, when the second object is the virtual object corresponding to one obtained by enlarging the first object, a second distance that is a distance from the virtual observation position to the second object is longer than a first distance that is a distance or an estimated distance from the real observation position or the virtual observation position to the first object, and when the second object is the virtual object corresponding to one obtained by reducing the first object, the second distance is shorter than the first distance, wherein a ratio of the second distance to the first distance is same or approximately same as a ratio of a linear dimension of the second object to a linear dimension of the first object.

7. A non-transitory computer-readable recording medium storing a program for causing a computer to function as the image processing device according to claim 6.

8. An image processing device comprising processing circuitry configured to implement a visual object generator which generates a second object that is a visual object in a virtual reality space, the second object being a virtual object corresponding to one obtained by enlarging or reducing a first object, wherein a first visual angle that is a visual angle or an estimated visual angle formed by the first object at a real observation position in a real space or a virtual observation position in the virtual reality space is same or approximately same as a second visual angle that is a visual angle formed by the second object at the virtual observation position, when the second object is the virtual object corresponding to one obtained by enlarging the first object, a second distance that is a distance from the virtual observation position to the second object is longer than a first distance that is a distance or an estimated distance from the real observation position or the virtual observation position to the first object, and when the second object is the virtual object corresponding to one obtained by reducing the first object, the second distance is shorter than the first distance, wherein the first object is a visual object in the real space or an object imitating the visual object in the real space, the first visual angle formed by the first object is a visual angle formed by the visual object in the real space at the real observation position, the first distance is a distance from the real observation position to the visual object in the real space, a first ratio of the second distance to the first distance when a first excess of the first distance with respect to a predetermined distance is a first value is greater than a second ratio of the second distance to the first distance when a second excess of the first distance with respect to the predetermined distance is a second value, and the first value is greater than the second value.

9. A non-transitory computer-readable recording medium storing a program for causing a computer to function as the image processing device according to claim 8.

10. An image processing method comprising a visual object generation step of generating a second object that is a visual object in a virtual reality space, the second object being a virtual object corresponding to one obtained by enlarging or reducing a first object, wherein an angle for a particular object at an observation position between one end of the particular object observed from an observation position and an opposite end of the particular object observed from the observation position is referred to as a visual angle formed by the particular object, a first visual angle that is a visual angle or an estimated visual angle formed by the first object at a real observation position in a real space or a virtual observation position in the virtual reality space is same as a second visual angle that is a visual angle formed by the second object at the virtual observation position, when the second object is the virtual object corresponding to one obtained by enlarging the first object, a second distance that is a distance from the virtual observation position to a center point of 3D shape of the second object is longer than a first distance that is a distance or an estimated distance from the real observation position or the virtual observation position to a center point of 3D shape of the first object, and when the second object is the virtual object corresponding to one obtained by reducing the first object, the second distance is shorter than the first distance.

11. An image processing method comprising a visual object generation step of generating a second object that is a visual object in a virtual reality space, the second object being a virtual object corresponding to one obtained by enlarging or reducing a first object, wherein a first visual angle that is a visual angle or an estimated visual angle formed by the first object at a real observation position in a real space or a virtual observation position in the virtual reality space is same or approximately same as a second visual angle that is a visual angle formed by the second object at the virtual observation position, when the second object is the virtual object corresponding to one obtained by enlarging the first object, a second distance that is a distance from the virtual observation position to the second object is longer than a first distance that is a distance or an estimated distance from the real observation position or the virtual observation position to the first object, and when the second object is the virtual object corresponding to one obtained by reducing the first object, the second distance is shorter than the first distance, wherein a ratio of the second distance to the first distance is same or approximately same as a ratio of a linear dimension of the second object to a linear dimension of the first object.

12. An image processing method comprising a visual object generation step of generating a second object that is a visual object in a virtual reality space, the second object being a virtual object corresponding to one obtained by enlarging or reducing a first object, wherein a first visual angle that is a visual angle or an estimated visual angle formed by the first object at a real observation position in a real space or a virtual observation position in the virtual reality space is same or approximately same as a second visual angle that is a visual angle formed by the second object at the virtual observation position, when the second object is the virtual object corresponding to one obtained by enlarging the first object, a second distance that is a distance from the virtual observation position to the second object is longer than a first distance that is a distance or an estimated distance from the real observation position or the virtual observation position to the first object, and when the second object is the virtual object corresponding to one obtained by reducing the first object, the second distance is shorter than the first distance, wherein the first object is a visual object in the real space or an object imitating the visual object in the real space, the first visual angle formed by the first object is a visual angle formed by the visual object in the real space at the real observation position, the first distance is a distance from the real observation position to the visual object in the real space, a first ratio of the second distance to the first distance when a first excess of the first distance with respect to a predetermined distance is a first value is greater than a second ratio of the second distance to the first distance when a second excess of the first distance with respect to the predetermined distance is a second value, and the first value is greater than the second value.

\* \* \* \* \*